United States Patent
Oguchi et al.

(10) Patent No.: US 6,169,528 B1
(45) Date of Patent: *Jan. 2, 2001

(54) ELECTRON GENERATING DEVICE, IMAGE DISPLAY APPARATUS, DRIVING CIRCUIT THEREFOR, AND DRIVING METHOD

(75) Inventors: Takahiro Oguchi, Yamato; Hidetoshi Suzuki, Fujisawa; Kunihiro Sakai, Isehara; Takamasa Sakuragi, Hiratsuka; Yasuyuki Todokoro, Yokohama, all of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/689,656

(22) Filed: Aug. 13, 1996

(30) Foreign Application Priority Data

| Aug. 23, 1995 | (JP) | 7-214555 |
|---|---|---|
| Jan. 8, 1996 | (JP) | 8-000834 |
| Aug. 8, 1996 | (JP) | 8-209668 |

(51) Int. Cl.$^7$ .................................................. G09G 3/22
(52) U.S. Cl. .............................................. 345/74; 345/77
(58) Field of Search .............................. 345/87, 74, 75, 345/76, 77

(56) References Cited

U.S. PATENT DOCUMENTS

| 3,938,034 | 2/1976 | Japenga | 324/20 R |
|---|---|---|---|
| 4,686,575 | * 8/1987 | Shimada et al. | 345/77 |
| 4,864,538 | * 9/1989 | Buzak | 345/87 |
| 4,904,895 | 2/1990 | Tsukamoto et al. | 313/336 |

(List continued on next page.)

FOREIGN PATENT DOCUMENTS

| 0278405A3 | 8/1988 | (EP) . |
|---|---|---|
| 0299461A2 | 1/1989 | (EP) . |
| 0573754A1 | 12/1993 | (EP) . |
| 0596242A1 | 5/1994 | (EP) . |
| 660367A1 | 6/1995 | (EP) . |

(List continued on next page.)

OTHER PUBLICATIONS

Elinson, M.L, et al., "The Emission Of Hot Electrons And The Field Emission Of Electrons From Tin Oxide", Radio Engineering and Electronic Physics, vol. 7, Jul. 1965, pp. 1290–1296.

(List continued on next page.)

Primary Examiner—Matthew Luu
(74) Attorney, Agent, or Firm—Fitzpatrick, Cella, Harper & Scinto

(57) ABSTRACT

In order to prevent voltage drops across the wiring resistances in a multi-electron source having a plurality of electron emitters wired in the form of a matrix through a plurality of data wiring layers and a plurality of scanning wiring layers, a constant current signal is output to each data wiring layer. At this time, each non-selected data wiring layer tends to be set at a high impedance and vary in potential, resulting in an abnormal turn-on operation or an electron orbit shift. A driving circuit for solving this problem is provided. A switch for switching a constant current output unit for outputting a constant current regardless of the impedance of a signal output destination, and a constant voltage output unit for outputting a constant voltage regardless of the impedance of a signal output destination is connected to each data wiring layer. For example, a constant-current circuit (17) as a current output unit always outputs the same current (I1 to In) to a switch (30). A pulse width signal (PW1 to PWn) from a pulse-width modulation circuit (7) serves to switch the mode of outputting a current (I1 to In) to a data wiring layer ($D_{y1}$ to $D_{yn}$) and the mode of fixing a data wiring layer to voltage GND.

31 Claims, 31 Drawing Sheets

U.S. PATENT DOCUMENTS

| | | | |
|---|---|---|---|
| 4,954,744 | 9/1990 | Suzuki et al. | 313/336 |
| 4,956,578 | 9/1990 | Shimizu et al. | 315/1 |
| 5,066,883 | 11/1991 | Yoshioka et al. | 313/309 |
| 5,155,416 | 10/1992 | Suzuki et al. | 315/366 |
| 5,157,309 | 10/1992 | Parker et al. | 315/169.1 |
| 5,235,254 | 8/1993 | Ho | 315/219 |
| 5,300,862 | 4/1994 | Parker et al. | 315/169.1 |
| 5,313,140 | 5/1994 | Smith et al. | 315/169.1 |
| 5,404,081 | 4/1995 | Kane et al. | 315/169.1 |
| 5,446,720 | 8/1995 | Oguchi et al. | 369/126 |
| 5,530,314 | 6/1996 | Banno et al. | 313/310 |
| 5,578,906 | 11/1996 | Smith | 315/169.3 |
| 5,583,528 | 12/1996 | Ebihara | 345/58 |
| 5,650,795 | 7/1997 | Banno et al. | 345/74 |
| 5,659,329 | 8/1997 | Yamanobe et al. | 345/74 |
| 5,682,085 | 10/1997 | Suzuki et al. | 315/169.1 |
| 5,838,097 | 11/1998 | Kasanuki et al. | 313/495 |

FOREIGN PATENT DOCUMENTS

| | | | |
|---|---|---|---|
| 59-45708 | 3/1984 | (JP) | H03G 3/02 |
| 64-31332 | 2/1989 | (JP) . | |
| 2-257551 | 10/1990 | (JP) . | |
| 3-55738 | 3/1991 | (JP) | H01J 1/30 |
| 4-28137 | 1/1992 | (JP) | H01J 1/30 |

OTHER PUBLICATIONS

Dittmer, G., "Electrical Conduction and Electron Emission of Discontinuous Thin Films", Thin Solid Films—Elsevier Sequoia S.A., Lausanne, Switzerland, Jul. 4, 1971, pp. 317–329.

Hartwell, M., et al., "Strong Electron Emission From Patterned Tin–Indium Oxide Thin Films", International Electron Devices Meeting 1975, Washington D.C., pp. 519–521.

Spindt, C.A., et al., "Physical properties of thin–film emission cathodes with molybdenum cones", Journal of Applied Physics, vol. 47, No. 12, Dec. 1976, pp. 5248–5263.

Araka, Hisashi, et al., Electroforming and Electron Emission of Carbon Thin Films, Journal of the Vacuum Society of Japan, vol. 26, No. 1, Sep. 24, 1981, pp. 22–29.

Dyke, W.P., et al., "Field Emission", Advances in Electronics and Electron Physics, vol. VIII, Academic Press Inc., Publishers, New York, New York 1956, pp. 90–185.

Mead, C.A., "Operation of Tunnel–Emission Devices", Journal of Applied Physics, vol. 32, Apr., 1961, pp. 646–652.

Araka, Hisashi, et al., "Electroforming and Electron Emission of Carbon Thin Films", Journal of the Vacuum Society of Japan, vol. 26, No. 1, Sep. 24, 1981, pp. 22–29.

Meyer, R., et al., "Recent Development on Microtips Display at Leti", Technical Digest of IVMC 91, Nagahama 1991, pp. 6–9.

* cited by examiner

FIG. 4A HSYNC
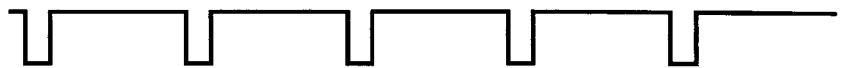
FIG. 4B SELECTED EMITTER ADDRESS
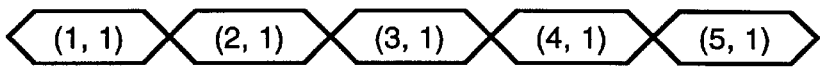
FIG. 4C VIDEO SIGNAL
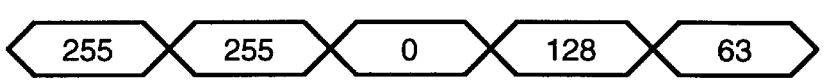
FIG. 4D PULSE-WIDTH MODULATION CIRCUIT OUTPUT (PW1)
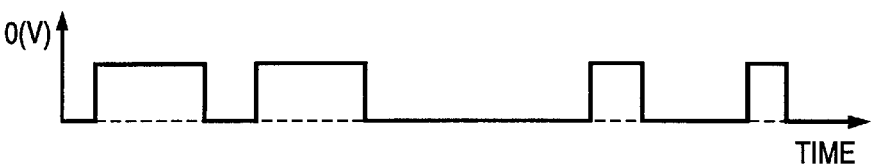
FIG. 4E CONSTANT-CURRENT CIRCUIT OUTPUT
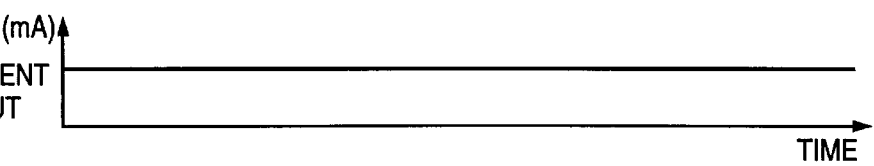
FIG. 4F VOLTAGE OF COLUMN WIRING LAYER 1 (Dy1)
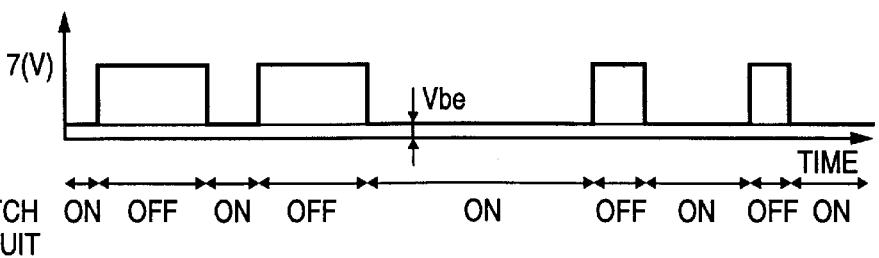
FIG. 4G EMISSION CURRENT Ie
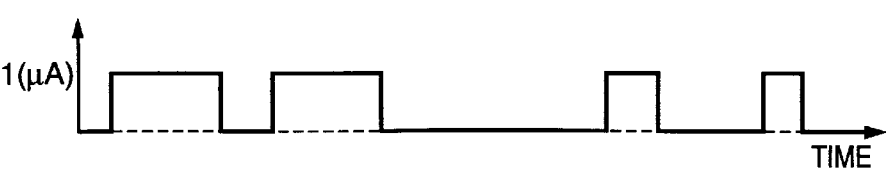

1010 BLACK CONDUCTOR

1010 BLACK CONDUCTOR

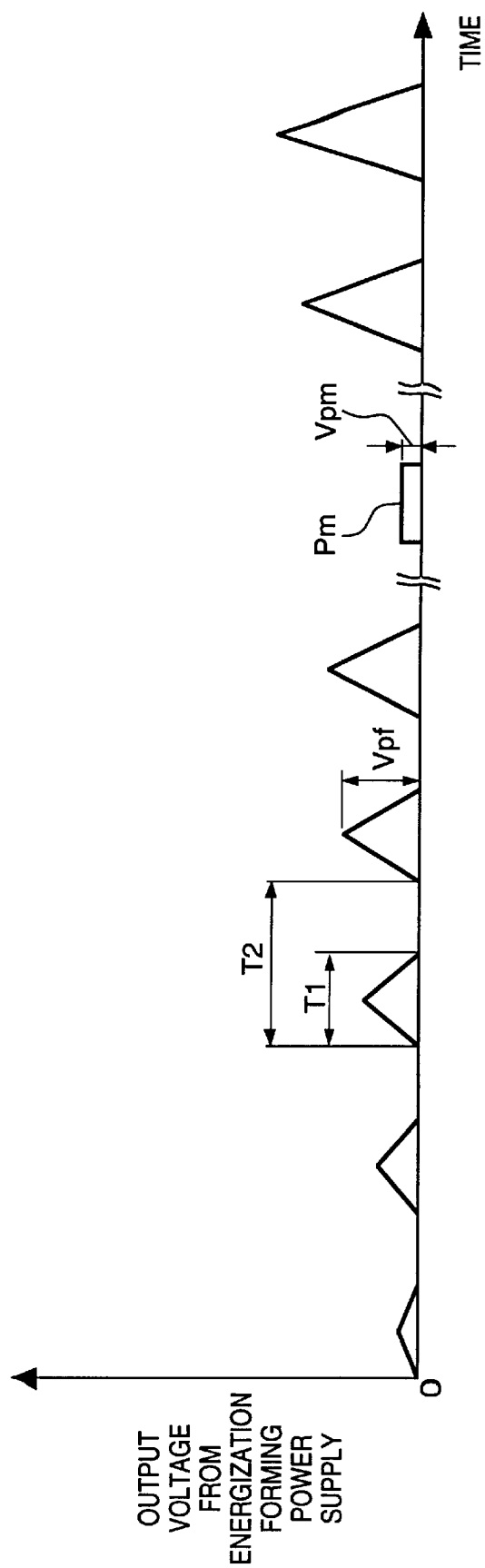

HSYNC

SELECTED EMITTER ADDRESS

VIDEO SIGNAL

PULSE-WIDTH MODULATION CIRCUIT OUTPUT (PW1)

CONSTANT-CURRENT CIRCUIT OUTPUT

VOLTAGE OF COLUMN WIRING LAYER 1 (Dy1)

EMISSION CURRENT Ie

HSYNC

SELECTED EMITTER ADDRESS

VIDEO SIGNAL

PULSE-HEIGHT MODULATION CIRCUIT OUTPUT (AW1)

DRIVE PULSE OUTPUT

VOLTAGE OF COLUMN WIRING LAYER 1 (Dy1)

EMISSION CURRENT Ie

FIG. 21
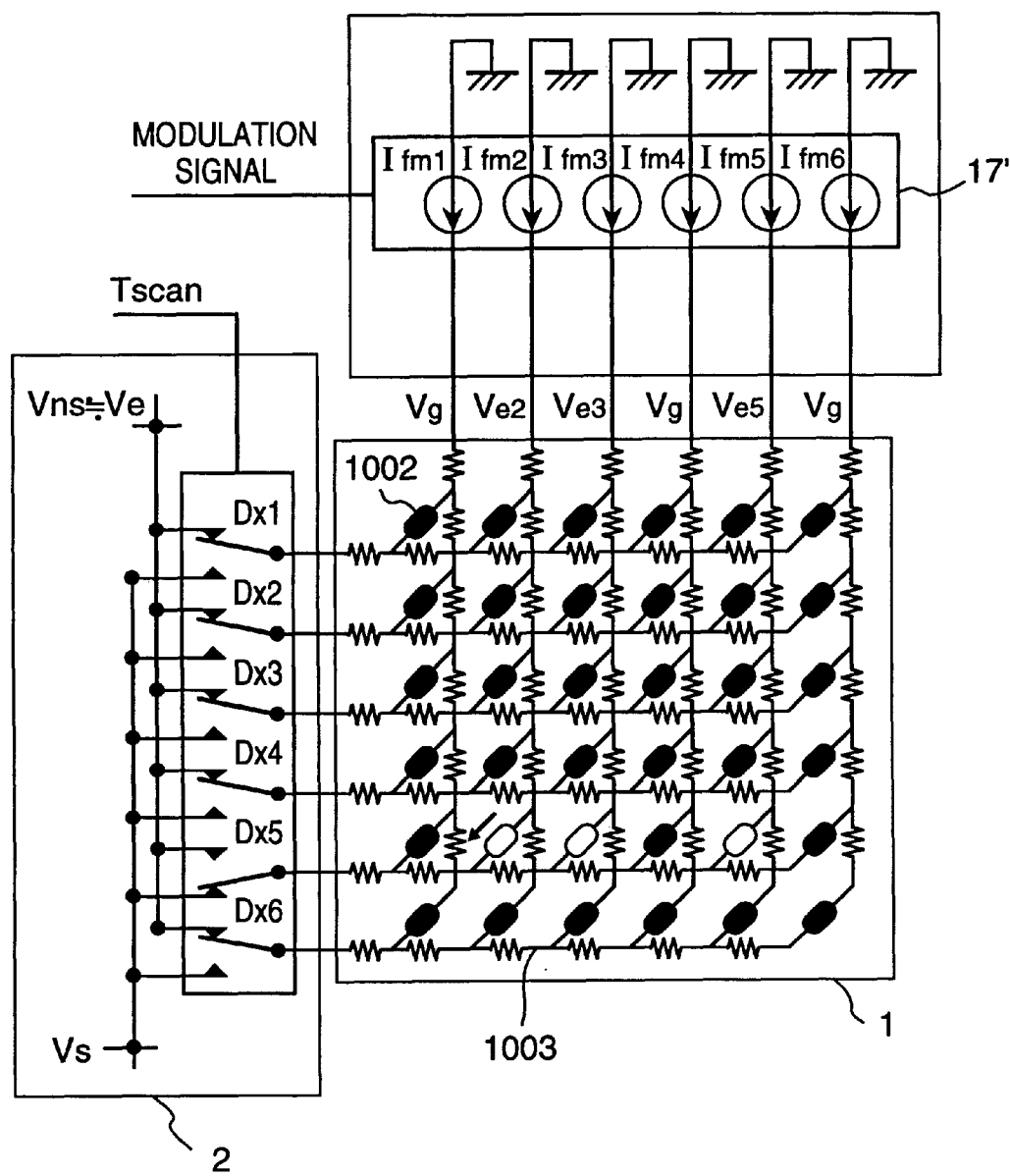
 : EMITTER TO BE TURNED ON
 : EMITTER NOT TO BE TURNED ON AT VOLTAGE LOWER THAN APPLIED VOLTAGE Vth

2001 INDIVIDUAL VOLTAGE/CURRENT CONVERSION CIRCUIT

ELECTRON GENERATING DEVICE, IMAGE DISPLAY APPARATUS, DRIVING CIRCUIT THEREFOR, AND DRIVING METHOD

BACKGROUND OF THE INVENTION

The present invention relates to an electron generating device including a multi-electron source having a plurality of electron emitters wired in the form of a matrix and a driving circuit for the multi-electron source, an image display apparatus, a driving circuit, and a driving method.

Conventionally, two types of devices, namely thermionic and cold cathode devices, are known as electron emitters. Examples of cold cathode devices are field emission type electron emitters (to be referred to as field emitters hereinafter), metal/insulator/metal type electron emitters (to be referred to as MIM-type electron emitters hereinafter), and surface-conduction type electron emitters.

Known examples of the field emitters are described in W. P. Dyke and W. W. Dolan, "Field Emission", Advance in Electron Physics, 8, 89 (1956) and C. A. Spindt, "Physical Properties of thin-film field emission cathodes with molybdenum cones", J. Appl. Phys., 47, 5248 (1976). FIG. 31 is a sectional view of a device according to C. A. Spindt et al. Referring to FIG. 31, reference numeral 3010 denotes a substrate, 3011, an emitter wiring layer made of a conductive material; 3012, an emitter cone; 3013, an insulating layer; and 3014, a gate electrode. In this device, a proper voltage is applied between the emitter cone 3012 and the gate electrode 3014 to emit electrons from the distal end portion of the emitter cone 3012.

A known example of the MIM-type electron emitters is described in C. A. Mead, "Operation of Tunnel-Emission Devices", J. Appl. Phys., 32,646 (1961). FIG. 32 is a sectional view of an MIM-type electron emitter. Referring to FIG. 32, reference numeral 3020 denotes a substrate; 3021, a lower electrode made of a metal; 3022, a thin insulating layer having a thickness of about 100 Å; and 3023, an upper electrode made of a metal and having a thickness of about 80 to 300 Å. In the MIM type, a voltage is applied between the upper electrode 3023 and the lower electrode 3021 to emit electrons from the surface of the upper electrode 3023.

A known example of the surface-conduction type electron emitters is described in, e.g., M. I. Elinson, "Radio Eng. Electron Phys., 10, 1290 (1965) and other examples to be described later.

The surface-conduction type electron emitter utilizes the phenomenon that electron emission takes place in a small-area thin film, formed on a substrate, upon flowing a current parallel to the film surface. The surface-conduction type electron emitter includes electron emitters using an Au thin film (G. Dittmer, "Thin Solid Films", 9,317 (1972)), an $In_2O_3/SnO_2$ thin film (M. Hartwell and C. G. Fonstad, "IEEE Trans. ED Conf.", 519 (1975)), a carbon thin film (Hisashi Araki et al., "Vacuum", vol. 26, No. 1, p. 22 (1983), and the like, in addition to an $SnO_2$ thin film according to Elinson mentioned above.

FIG. 30 is a plan view of the surface-conduction type electron emitter according to M. Hartwell et al. as a typical example of the structures of these surface-conduction type electron emitters. Referring to FIG. 30, reference numeral 3001 denotes a substrate; and 3004, a conductive thin film made of a metal oxide formed by spattering. This conductive thin film 3004 has an H-shaped pattern, as shown in FIG. 30. An electron-emitting portion 3005 is formed by performing an energization process (referred to as an energization forming process to be described later) with respect to the conductive thin film 3004. Referring to FIG. 30, an interval L is set to 0.5 to 1 mm, and a width W is set to 0.1 mm. For the sake of illustrative convenience, the electron-emitting portion 3005 is shown in a rectangular shape at the center of the conductive thin film 3004. However, this does not exactly show the actual position and shape of the electron-emitting portion.

In the above surface-conduction type electron emitters according to M. Hartwell et al., typically the electron-emitting portion 3005 is formed by performing an energization process called the energization forming process for the conductive thin film 3004 before electron emission. According to the energization forming process, energization is performed by applying a constant DC voltage which increases at a very low rate of, e.g., 1 V/min., across the two ends of the conductive film 3004, so as to partially destroy or deform the conductive film 3004, thereby forming the electron-emitting portion 3005 with an electrically high resistor. Note that the destroyed or deformed part of the conductive thin film 3004 has a fissure. Upon application of an appropriate voltage to the conductive thin film 3004 after the energization forming process, electron emission is performed near the fissure.

The above surface-conduction type electron emitters are advantageous because they have a simple structure and can be easily manufactured. For this reason, many devices can be formed on a wide area. As disclosed in Japanese Patent Laid-Open No. 64-31332 filed by the present applicant, a method of arranging and driving a lot of devices has been studied.

Regarding applications of surface-conduction type electron emitters to, e.g., image forming apparatuses such as an image display apparatus and an image recording apparatus, charged beam sources and the like have been studied.

As an application to image display apparatuses, in particular, as disclosed in the U.S. Pat. No. 5,066,883 and Japanese Patent Laid-Open No. 2-257551 filed by the present applicant, an image display apparatus using the combination of a surface-conduction type electron emitter and a phosphor which emits light upon irradiation of an electron beam has been studied. This type of image display apparatus is expected to have more excellent characteristic than other conventional image display apparatuses. For example, in comparison with recent popular liquid crystal display apparatuses, the above display apparatus is superior in that it does not require a backlight since it is of a self-emission type and that it has a wide view angle.

The present inventors have experimented on surface-conduction type electron emitters made of various materials, manufactured by various methods, and having various structures as well as the one described above. The present inventors have also studied multi-electron sources each constituted by an array of many surface-conduction type electron emitters, and image display apparatuses using the multi-electron sources.

The present inventors have experimentally manufactured a multi-electron source formed by an electrical wiring method like the one shown in FIG. 33. In this multi-electron source, a large number of surface-conduction type electron emitters are two-dimensionally arrayed and wired in the form of a matrix, as shown in FIG. 33.

Referring to FIG. 33, reference numeral 4001 denotes a surface-conduction type electron emitter which is schematically shown; 4002, a row wiring layer; and 4003, a column wiring layer. In reality, the row and column wiring layers 4004 and 4005 have finite electric resistors. However, FIG.

33 shows these resistors as wiring resistors 4004 and 4005. The above wiring method will be referred to as simple matrix wiring.

For the sake of illustrative convenience, FIG. 33 shows a 6×6 matrix. However, the size of a matrix is not limited to this. For example, in a multi-electron source for an image display apparatus, a sufficient number of emitters for a desired image display operation are arrayed and wired.

In the multi-electron source having the surface-conduction type electron emitters wired in the form of a simple matrix, in order to output desired electron beams, proper electrical signals are applied to the row and column wiring layers 4002 and 4003. For example, in order to drive the surface-conduction type electron emitters on an arbitrary row in the matrix, a selection voltage Vs is applied to the row wiring layer 4002 on a selected row, and at the same time, a non-selection voltage Vns is applied to each row wiring layer 4002 on the non-selected rows. A drive voltage Ve is applied to each column wiring layer 4003 in synchronism with the non-selection voltage Vs. According to this method, ignoring voltage drops caused by wiring resistors 4004 and 4005, a voltage Ve−Vs is applied to each surface-conduction type electron emitter on the selected row, whereas a voltage Ve−Vns is applied to each surface-conduction type electron emitter on the non-selected rows. If, therefore, the voltages Ve, Vs, and Vns are set to proper voltages, an electron beam having a desired intensity should be output from each surface-conduction type electron emitter on only a selected row. In addition, if different drive voltages Ve are applied to the respective column wiring layers, electron beams having different intensities should be output from the respective emitters on a selected row. Since the response speed of each surface-conduction type electron emitter is high, the length of time that an electron beam is kept output should be changed if the length of time that the drive voltage Ve is kept applied is changed.

Various applications of such a multi-electron source having surface-conduction type electron emitters wired in the form of a simple matrix have therefore been studied. For example, this electron source is expected to be used in an image display apparatus which applies voltage signals in accordance with image information.

In practice, however, when the multi-electron source to which a voltage source is connected is driven by the above voltage application method, voltage drops occur across wiring resistors, resulting in variations in voltages effectively applied to the respective surface-conduction type electron emitters. The first cause for variations in voltages applied to the respective emitters is that the respective surface-conduction type electron emitters in the simple matrix wiring structure have different wiring lengths (i.e., different wiring resistors).

The second cause is that voltage drops caused by the wiring resistors 4004 in the respective row wiring layers vary. This is because a current branches from the row wiring layer on a selected row to the respective surface-conduction type electron emitters connected thereto so as to cause nonuniform currents to flow in the respective wiring resistors 4004.

The third cause is that the magnitude of a voltage drop caused by a wiring resistor changes depending on the driving pattern (the image pattern to be displayed in the case of an image display apparatus). This is because a current flowing in a wiring resistor changes depending on the driving pattern.

If the voltages applied to the respective surface-conduction type electron emitters vary due to the above causes, the intensity of an electron beam output from each surface-conduction type electron emitter deviates from a desired value, posing a problem in practical use. For example, when the electron source is applied to an image display apparatus, the luminance of the displayed image becomes nonuniform, or variations in luminance occur depending on the display image pattern. In addition, variations in voltage tend to increase with an increase in the size of a simple matrix. This tendency is a factor that limits the number of pixels in an image display apparatus.

In the process of studying such techniques in consideration of the above problems, the present inventors have already experimented on a driving method different from the above voltage application method. In this method, when a multi-electron source having surface-conduction type electron emitters wired in the form of a simple matrix is to be driven, a current source for supplying currents required to output desired electron beams is connected to the column wiring layers, instead of connecting a voltage source for applying the drive voltage Ve to each column wiring layer, so as to drive the multi-electron source. This method was devised in consideration of the strong correlation between the current (to be referred to as an emitter current If hereinafter) flowing in each surface-conduction type electron emitter and the electron beam (to be referred to as an emission current Ie hereinafter) emitted from each emitter. In the method, the magnitude of the emission current Ie is controlled by limiting the magnitude of the emitter current If.

That is, the magnitude of the emitter current If to be supplied to each surface-conduction type electron emitter is determined by referring to the (emitter current If) to (emission current Ie) characteristics of each surface-conduction type electron emitter, and the emitter current If is supplied from the current source connected to each column wiring layer. More specifically, a driving circuit may be constituted by a combination of electric circuits such as a memory storing the (emitter current If) to (emission current Ie) characteristics, an arithmetic unit for determining the emitter current If to be supplied, and a controlled current source. As the controlled current source, a circuit form for temporarily converting the magnitude of the emitter current If to be supplied into a voltage signal, and converting the signal into a current using a voltage/current conversion circuit may be used. This method is less susceptible to voltage drops caused by wiring resistors than the above method of driving the multi-electron source using the voltage source connected to each column wiring layer. It was found therefore that this method could reduce variations in the intensity of an electron beam to be output.

However, the following problem is posed in the method of driving the electron source using the current source connected thereto. This problem will be described with reference to FIG. 34. FIG. 34 shows a case wherein the multi-electron source in FIG. 33 is driven by current sources. A selection potential Vs=−7 V is applied to a row wiring layer $D_{x1}$ of row wiring layers 4002, and a non-selection potential Vns=0 V is applied to the remaining row wiring layers 4002, i.e., row wiring layers $D_{x2}$ to $D_{x6}$. Column wiring layers 4003, i.e., column wiring layers $D_{y1}$ to $D_{y6}$, are connected to constant current sources 4006. With this arrangement, the emitters on the row wiring layer to which the selection potential has been applied are driven by the constant currents. In this case, the set value of each constant current is set to a magnitude at which each emitter emits electrons. With this setting, when a current is output from each current source, a set emitter current If flows in each emitter on the row to which the selection potential has been applied. As a result, each emitter emits electrons.

At this time, control must be performed to inhibit some emitter from emitting electrons (turn-off operation) depending on an actual video signal. Consider, for example, a case wherein no electrons are to be emitted from the emitter at the intersection of the row wiring layer $D_{x1}$ and the column wiring layer $D_{y2}$, of the emitters on the row wiring layer $D_{x1}$ to which the selection potential Vs has been applied, as shown in FIG. 34. In this case, the constant current source connected to the column wiring layer $D_{y2}$ is set in a state in which no current is output. This state in which the output current from the constant current source is set to 0 is equivalent to a state in which the output impedance of the constant current source becomes infinite. As a result, the column wiring layer $D_{y2}$ is set in a high-impedance state. When a row or column wiring layer of a simple matrix is set in the high-impedance, the following problems are posed.

(1) A wiring layer in the high-impedance state which is not determined by a current source output has a potential determined by the influences of other driven emitters or a driving pattern. For this reason, even if a current source connected to a column is controlled to inhibit an emitter from emitting electrons, a potential to be applied to this emitter on the column cannot be determined. That is, an emitter on a wiring layer in the high-impedance state may emit electrons regardless of a video signal (abnormal turn-on operation) depending on the influences of other driven emitters, a driving pattern, and the state of a selection/non-selection voltage.

(2) In an image display apparatus using a combination of a surface-conduction type electron emitter and a phosphor which emits light upon irradiation of an electron beam, the orbit of an electron beam is influenced by a high voltage applied to the phosphor side, and the potentials of adjacent row and column wiring layers. If, therefore, there is a wiring layer potential of a high impedance, the electron orbits of emission electrons from adjacent lines are influenced. In, for example, a color display apparatus, an electron beam shift may cause color misregistration.

SUMMARY OF THE INVENTION

It is an object of the present invention to provide a driving circuit designed to perform a current driving operation, which is advantageous in overcoming the problem of voltage drops, without causing any abnormal turn-on operation and electron orbit shift, an electron generating device using the same, an image display apparatus, and a driving method therefor.

In order to achieve the above object, the present inventors have made efforts to obtain the following. There is provided an electron generating device comprising a multi-electron source having a plurality of electron emitters wired in the form of a matrix through a plurality of data wiring layers and a plurality of scanning wiring layers, and a driving circuit for driving the multi-electron source, characterized in that a constant current output unit for outputting a constant current and a constant voltage output unit for outputting a constant voltage are connected to the data wiring layers via a switch. The present invention includes an image display apparatus using the electron generating device. According to the present invention, there is provided an image display apparatus comprising a multi-electron source having a plurality of electron emitters wired in the form of a matrix through a plurality of data wiring layers and a plurality of scanning wiring layers, a driving circuit for driving the multi-electron source, and a phosphor which is excited to emit light upon irradiation of electrons, characterized in that a constant current output unit for outputting a constant current and a constant voltage output unit for outputting a constant voltage are connected to the data wiring layers via a switch. The present invention includes a driving circuit for the electron generating device and the image display apparatus. According to the present invention, there is provided a driving circuit for driving a multi-electron source having a plurality of electron emitters wired in the form of a matrix through a plurality of data wiring layers and a plurality of scanning wiring layers, characterized in that a constant current output unit for outputting a constant current and a constant voltage output unit for outputting a constant voltage are connected to the data wiring layers via a switch.

In the present invention, the constant current output from the constant current output unit is preferably an emitter current to be flowed to the electron emitter to obtain a desired emission current, and the constant voltage output from the constant voltage output unit is preferably a voltage which is set such that a difference between the constant voltage and a scanning voltage applied to the scanning wiring layer is smaller than a value of an electron emission threshold voltage of the electron emitter. The switch preferably switches connection between the constant current output unit and the data wiring layer and connection between the constant voltage output unit and the data wiring layer. The switch preferably comprises switches equal in number to the data wiring layers. The switch preferably comprises a transistor. The transistor may be a bipolar transistor or enhancement type MOS transistor. If the transistor is a bipolar transistor, the collector or emitter is preferably grounded. If the transistor is an enhancement type MOS transistor, the drain or source is preferably grounded. The driving circuit preferably includes a pulse-width modulation circuit for performing a switching operation of the switch. The constant voltage output unit preferably comprises a GND wiring layer. The switch may include a diode. When the switch is a diode, the circuit preferably includes a timing generation circuit for performing a switching operation of the switch. The constant-current output unit preferably comprises a V/I converter. The switch preferably connects the data wiring layer to the constant voltage output unit when a value of a luminance signal is smaller than a value of a reference signal, and connects the data wiring layer to the constant current output unit when the value of the luminance signal is not less than the value of the reference signal. In addition, the switch preferably connects the data wiring layer connected to an electron source whose electron emission amount is to be 0 to the constant voltage output unit, and connects the data wiring layer connected to an electron source whose electron emission amount is to be a value other than 0 to the constant current output unit.

The present invention also a driving method for an electron generating device and an image display apparatus. According to the present invention, there is provided a driving method for an electron generating device including a multi-electron source having a plurality of electron emitters wired in the form of a matrix through a plurality of data wiring layers and a plurality of scanning wiring layers, and a driving circuit for outputting a luminance signal to the plurality of data wiring layers of the multi-electron source, characterized in that the luminance signal is output to the data wiring layers while a constant current signal and a constant voltage are switched.

In addition, according to the present invention, there is provided a driving method for an image display apparatus including a multi-electron source having a plurality of electron emitters wired in the form of a matrix through a plurality of data wiring layers and a plurality of scanning wiring layers, a driving circuit for outputting a luminance signal to the plurality of data wiring layers of the multi-electron source, and a phosphor plate which is excited to emit light upon irradiation of electrons, characterized in that the luminance signal is output to the data wiring layers while a constant current signal and a constant voltage are switched. The constant current signal is preferably output from a V/I converter. The constant voltage is preferably GND. The constant current signal and the constant voltage may be switched in accordance with an output signal from a pulse-width modulation circuit or a timing generation circuit. The timing generation circuit preferably outputs the constant current signal to the data wiring layer during a video display period, and outputs a pulse for setting the data wiring to the constant voltage during a blanking period.

According to the present invention, in a display apparatus in which a plurality of electron emitters are wired in the form of a matrix, and current sources for supplying currents required to output desired electron beams are connected to the emitters to drive them, the following effects can be obtained:

(1) Even if an output current from a constant-current source becomes 0, an abnormal turn-on operation of each emitter on the high-impedance wiring layer can be prevented.

(2) Even if an output current from a constant-current source becomes 0, the adverse effect of the high-impedance state on the orbits of electrons from the adjacent lines can be eliminated.

With these effects, an image which is very stable with respect to an original video signal can be displayed throughout the display screen.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 4A to 4G are timing charts associated with column wiring layer 1 in Example 1;

FIG. 9 is a timing chart showing energization forming voltages;

FIG. 21 is a view showing a multi-electron source and a driving circuit according to Example 4 of the present invention;

DETAILED DESCRIPTION OF THE PREFERRED EMBODIMENTS

Figure 1:
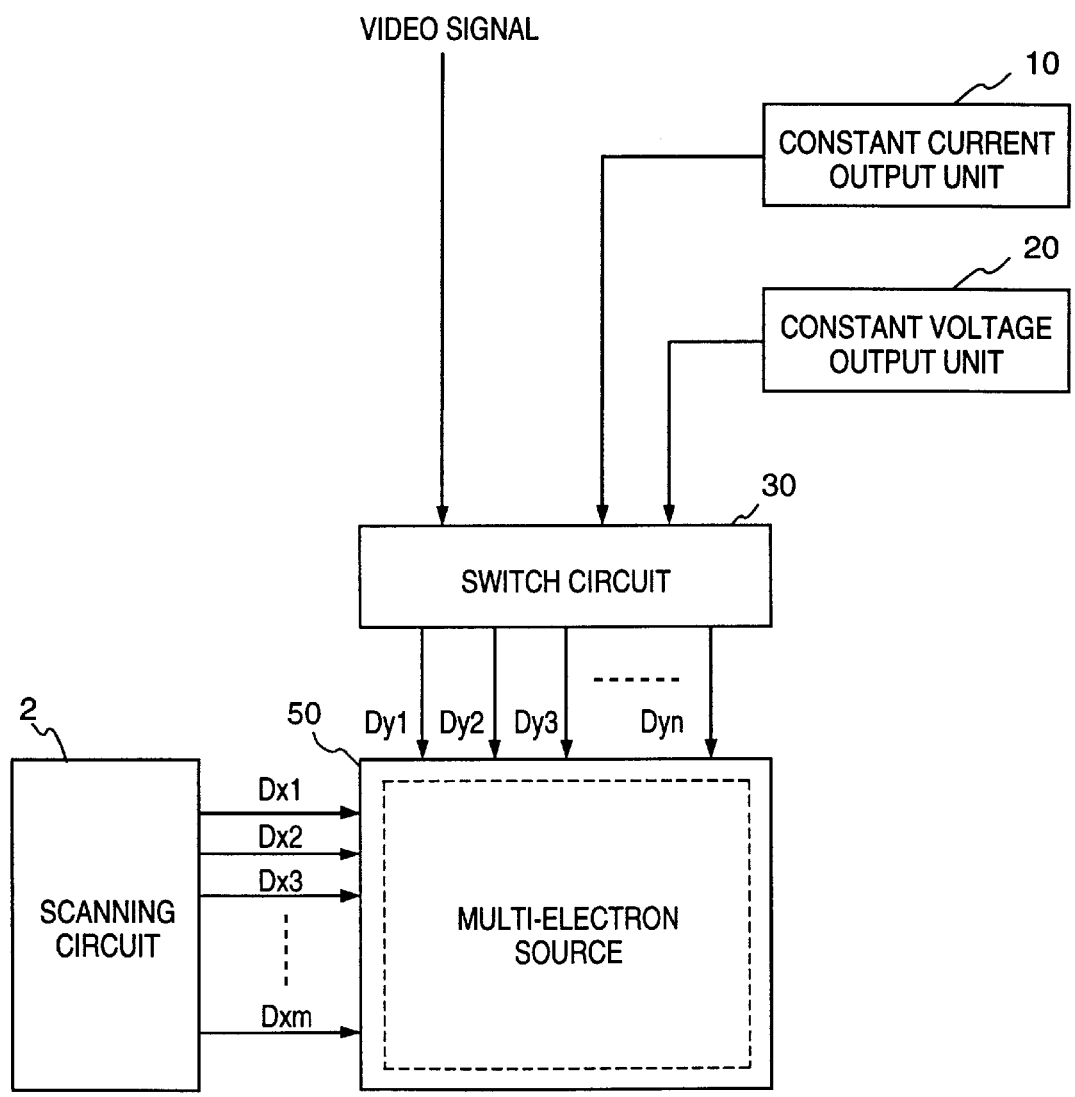
FIG. 1 is a block diagram showing a driving circuit of the present invention.

FIG. 1 shows the concept of the present invention. Referring to FIG. 1, reference numeral 10 denotes a constant current output unit; 20, a constant voltage output unit; 30, a switch; and 50, a multi-electron source. Reference symbols $D_{y1}, D_{y2}, \ldots, D_{yn}$ and $D_{x1}, D_{x2}, \ldots, D_{xm}$ respectively denote the terminals of the data and scanning wiring layers of the multi-electron source 50. The multi-electron source 50 is a portion for emitting electrons in multiple directions. If phosphors which are excited to emit light upon irradiation of electrons are arranged above the multi-electron source 50, a display panel is obtained. A scanning circuit 2 is a circuit for sequentially outputting selection signals to scanning wiring layers to line sequentially driving the multi-electron source 50. The constant current output unit 10 is a portion for outputting a constant current to the switch 30. The constant voltage output unit 20 is a portion for outputting a constant voltage to the switch 30. The switch 30 switches and outputs signals from the constant current output unit 10 and the constant voltage output unit 20 to the terminals $D_{y1}$ to $D_{yn}$ of the data wiring layers of the multi-electron source 50 in accordance with a video signal. The arrangement shown in FIG. 1 is based on the premise that column and row wiring layers are respectively used as data and scanning wiring layers, and line sequential driving is performed to select the rows one by one. However, column and row wiring layers may be used as scanning and data wiring layers, respectively, to perform line sequential driving so as to select the columns one by one.

As a circuit, the constant current output unit 10 may include only one V/I converter to serially output a constant current to the switch 30. Alternatively, the constant current output unit 10 may use wiring layers equal in number (n) to the wiring layers connected to the multi-electron source 50 to parallely output constant currents to the switch 30. The parallel constant currents may be different constant currents in consideration of reactive currents in the respective data wiring layers. As the V/I converter, a current mirror circuit, a Darlington connection circuit, a constant-current diode, or the like is available. The value of each constant current can be changed by changing the voltage (V) input to the V/I converter or the resistance of the resistor of the V/I converter.

As the electron sources constituting the multi-electron source 50, cold cathode devices are preferably used. Of the cold cathode devices, surface-conduction type electron emitters are more preferable. A dot matrix type image display apparatus can be manufactured by mounting a phosphor plate, which emits light upon irradiation of electrons, above the multi-electron source 50. Therefore, an electron generating device and an image display apparatus which use the driving circuit of the present invention fall within the scope of the present invention. The image display apparatus may be a color or monochrome image display apparatus. In the case of the color image display apparatus, the phosphor plate includes red (R), blue (B), and green (G) pixels, and the multi-electron source 50 also includes electron sources for the red pixels, electron sources for the blue pixels, and electron sources for the green pixels. The multi-electron source can expose a resist on a semiconductor substrate or can be used as an excitation source for image formation in a optical printer.

EXAMPLE 1
Driving Method and Correction Method

Figure 2:
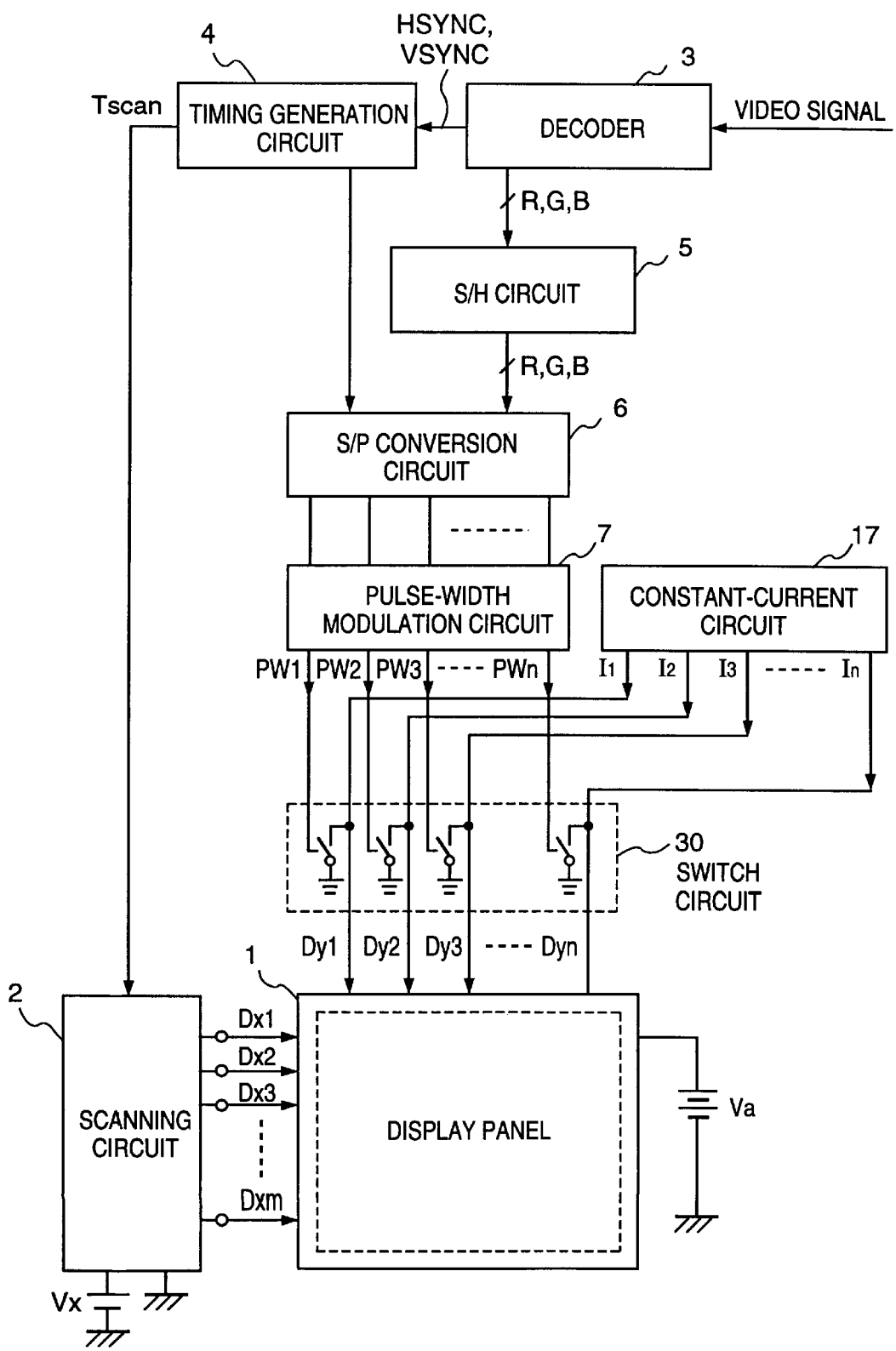
FIG. 2 is a block diagram showing the flow of a video signal in Example 1 of the present invention.

The driving and correction methods for the image display apparatus, which are the main features of the present invention, will be described. The arrangement of the image display apparatus including surface-conduction type electron emitters will be described with reference to FIG. 2. Referring to FIG. 2, reference numeral 1 denotes a display panel below which a multi-electron source is placed. The multi-electron source is constituted by electron sources arranged in the form of a simple matrix. A faceplate connected to a high-voltage power supply Va is mounted on the multi-electron source to accelerate electrons emitted from the multi-electron source. Reference symbols $D_{x1}$ to $D_{xm}$ denote the terminals of m row wiring layers; and $D_{y1}$ to $D_{yn}$, the terminals of n column wiring layers. These terminals are connected to an external electric circuit.

A scanning circuit 2 will be described. This circuit incorporates m switching elements. The respective switching elements are connected to the terminals $D_{x1}$ to $D_{xm}$. The m switching elements sequentially switch the potentials of the terminals $D_{x1}$ to $D_{xm}$ from a non-selection voltage Vns to a selection voltage Vs on the basis of a control signal Tscan output from a timing sinal generation circuit 4 (to be described later). In Example 1, the selection voltage Vs is set to a voltage Vx of a DC voltage source, and the non-selection voltage Vns is set to 0 V (GND).

The flow of a video signal will be described. The input composite video signal is separated by a decoder 3 into luminance signals of three primary colors (R, G, and B) and horizontal and vertical sync signals HSYNC and VSYNC. The timing generation circuit 4 generates various timing signals synchronized with the horizontal and vertical sync signals HSYNC and VSYNC. The R, G, and B luminance signals are sampled by an S/H circuit 5 at a proper timing. The held signals are converted by a serial/parallel conversion circuit (S/P conversion circuit) 6 into parallel video signals for one row in correspondence with the arrangement of pixels. The parallel video signals are then converted by a pulse-width modulation circuit 7 into voltage drive pulses (PW1, PW2, . . . ) each having a pulse width corresponding to the video signal intensity.

The image display apparatus also includes a constant-current circuit 17 for driving each emitter of the display panel 1 by a constant current. The constant-current circuit 17 to be described later is constituted by an array of n independent constant current sources. The outputs of the constant-current circuit 17 are connected to the terminals $D_{y1}$ to $D_{yn}$ connected to the column wiring layers of the display panel 1. In this case, constant-current circuit outputs (I1, I2, . . . , I3 . . . ) are connected to a constant voltage source through a switch 30. Each constant current output is switched between a constant current mode and a constant voltage mode under the control of the switch 30. This operation will be described below.

The switch 30 switches the constant current mode and the constant voltage mode in accordance with the voltage drive pulses (PW1, PW2, . . . ) output from the pulse-width modulation circuit 7 described above. More specifically, while a pulse corresponding to the input video signal intensity is kept generated, the switch 30 is in an OFF state, and each emitter of the display panel is driven by an output as a constant current from the constant-current circuit. In contrast to this, while no input video signal is received, the switch 30 in an ON state, and the terminals $D_{y1}$ to $D_{yn}$ are clamped to a constant potential. When this clamp potential is set to a potential at which no electrons are emitted from each emitter of the display panel 1, the potentials of the terminals $D_{y1}$ to $D_{yn}$ are fixed to the above potential, and hence no electron emission takes place.

When a current output pulse is supplied to the display panel, only the surface-conduction type electron emitter connected to a row selected by the scanning circuit 2 emits electrons for a period of time corresponding to the width of the supplied pulse, and the corresponding phosphor emits light. When the scanning circuit 2 sequentially scans selected rows, a two-dimensional image is formed.

Figure 3:
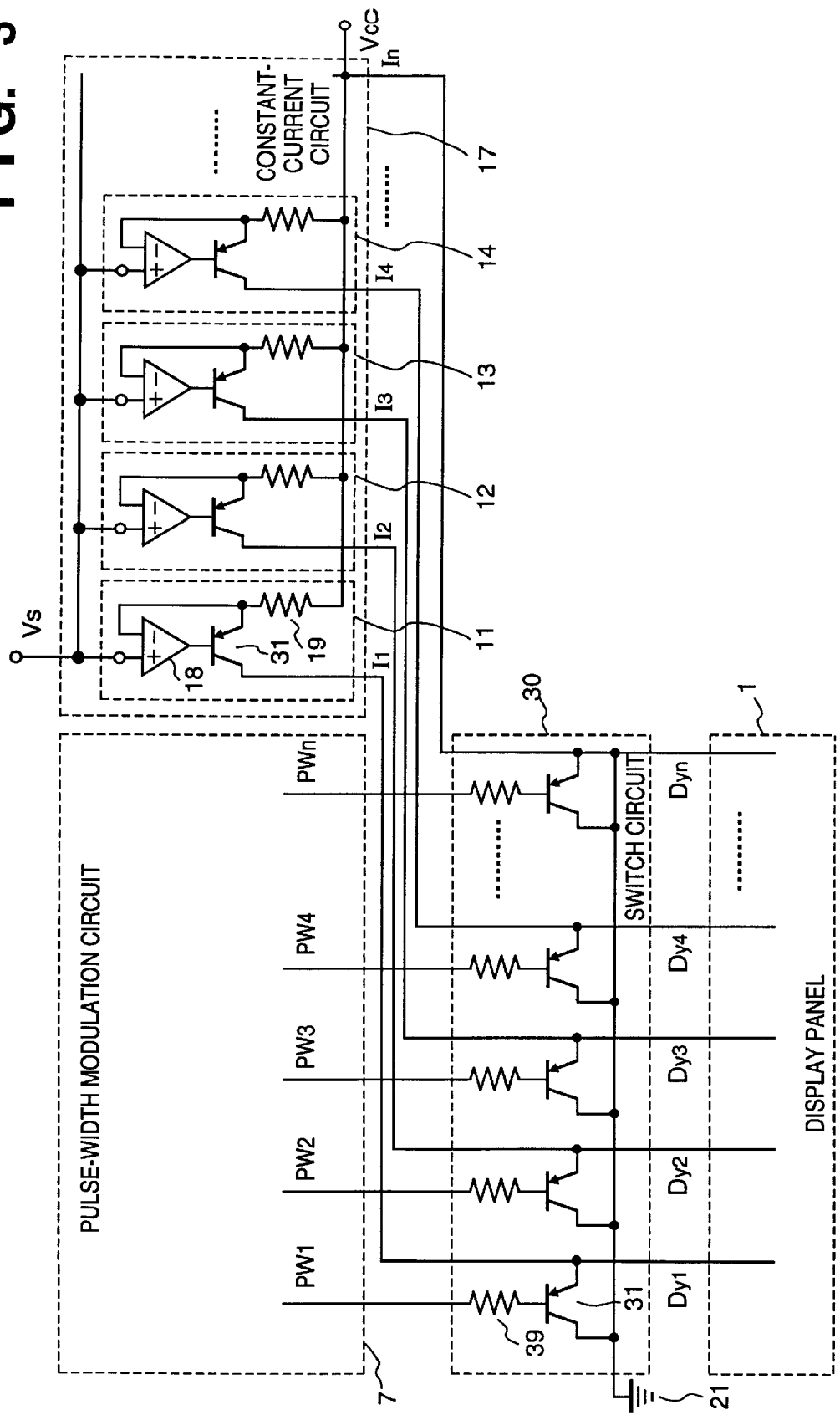
FIG. 3 is a circuit diagram showing switches and constant current-current circuits in Example 1.

The constant-current circuit 17 and the switch 30 as characteristic features of the present invention will be described in detail with reference to FIG. 3. The constant-current circuit 17 includes n independent constant current sources equal in number to the column wiring layers. Each constant current source is constituted by an operational amplifier, a transistor, and resistor. A current output from each constant current source is determined by $$I=(Vcc-Vs)/R \qquad (1)$$

where Vcc is the power supply voltage, Vs is the input voltage to each operational amplifier, and R is the resistance of each resistor in FIG. 3. The current output value is determined by properly selecting parameters according to equation (1). Of these parameters, the value of Vs can be easily changed. For this reason, a current amount can be easily determined by controlling the voltage Vs.

The switch 30 is constituted by transistors 31 and resistors 39. The base potential of each transistor 31 is turned on/off to perform a switching operation. More specifically, the emitter of the transistor 31 is connected to a constant current output, and the collector is connected to GND. The bases of the transistors 31A are connected to voltage drive pulses (PW1, PW2, . . . ) output from the pulse-width modulation circuit.

A switching operation in this case will be descried. As described above, each voltage drive pulse is a voltage pulse having a constant amplitude corresponding to the input video signal intensity. Assume that the voltage pulse is a pulse which changes between 0 V and Vcc.

Consider a case wherein the voltage pulse is at "Hi" (pulse height=Vcc). Since the potentials of constant-current circuit outputs (I1, I2, I3, . . . ) do not exceed Vcc, each transistor 31 is in the OFF state. Each of the terminals $D_{y1}$ to $D_{yn}$ is therefore driven by a constant current.

In contrast to this, when the voltage pulse is at "Lo" (pulse height=GND), each transistor is turned on, and each output current from the constant-current circuit flows to the collector of each transistor 31. At this time, each terminal is held at a constant potential of about 0 V (accurately Vbe: forward voltage drop amount).

In summary,

| "Hi" | off | constant ON current state |
| "Lo" | on | constant OFF voltage state |

That is, when electrons are to be emitted from emitters to turn on the panel, a driving operation is performed by constant currents. When the panel is not to be turned on, each terminal is clamped to a constant voltage.

A method of determining a set current value in a driving operation will be described. Assume that one emitter on the panel having a simple matrix structure is to be driven. In general, one line, e.g., line number M, is selected from the m rows (this operation will be referred to as row semi-selection), and at the same time, one line, e.g., line number N, is selected from the n columns (this operation will be referred to as column semi-selection). At this time, the emitters on the matrix are classified into three groups, i.e., A: one selected emitter (position M:N) to which a selection voltage is applied, B: the (m+n−1) emitters in the semi-selected state, and C: the (m×n−m−n) emitters in the non-selected state. Since the characteristics of each of the emitters constituting the simple matrix change nonlinearly with respect to a drive signal, the emitters in the semi-selected state B and the non-selected state C are not selected, but only one emitter (in the selected state A) is selectively driven. In practice, however, the influences of the emitters in the semi-selected state B on the same row or column on which the selected element is present cannot be neglected.

For example, in order to drive the emitter at the position (M,N) by a voltage +Vf, a row semi-selection potential of −½ Vf and a column semi-selection potential of +½ Vf are applied. At this time, the current flowing in the column selection line is equal to the sum total of the sum of the emitter currents in the semi-selected state which flow in the (m−1) surface-conduction type electron emitters present on a column N when the voltage +½ Vf is applied thereto, and the emitter current flowing in the selected emitter at the position (M,N) when the voltage +0 Vf is applied thereto. That is, the set emitter current amount in a constant-current driving operation is given by $$If = \sum_{K=1}^{m-1} If\ [+1/2Vf, (K, N)] + If\ [+Vf, (M, N)] \quad (2)$$

The value of If is determined by the (emission current Ie) to (emitter applied voltage Vf) characteristics and (emitter current If) to (emitter applied voltage Vf) characteristics of a single emitter used in practice.

Assume that when +Vf=14 V is applied, the emitter current If [+Vf=14, (M,N)]=0.7 mA, and the emission current Ie=1 $\mu$A. In this case, the currents flowing in the column selection line are the emitter currents (a total of 0.3 mA) in the semi-selected state which flow in the (m−1) surface-conduction type electron emitters on the column N when the voltage +½ Vf (−7 V) is applied thereto and the current (0.7 mA) flowing in the selected emitter. Therefore, 1 mA obtained by adding 0.3 mA and 0.7 mA is set to be the set current value in the constant-current circuit in a driving operation.

The outputs from the scanning circuit 2 were set to selection voltage Vs=−7 V and non-selection voltage=0 V, and a column selection line was driven by a current pulse having a peak value of 1 mA and a width corresponding to the input video signal intensity while selected rows were sequentially scanned. With this operation, each selected emitter was driven by a constant current of 0.7 mA to emit electrons of 1 $\mu$A.

In order to set the constant-current circuit output to 1 mA, each parameter of the constant-current circuit was determined according to equation (1) as follows:

Vcc=10 V,
R=5 k$\Omega$,
Vs=5 V

As described above, the output current from the constant-current circuit can be easily changed by changing the voltage Vs. In order to adjust the luminance, therefore, the voltage Vs was changed to control the output current amount so as to change the average luminance of the display panel 1.

FIGS. 4A to 4G show the waveforms of actual outputs from the respective circuits. Assume that luminance video signals like those shown in FIGS. 4A to 4C are input to a drive line of interest, which is connected to the terminal $D_{y1}$ of a column wiring layer of the display panel, with time. FIG. 4D shows the waveform of a voltage drive pulse (PW1, PW2, . . . ) as an output from the pulse-width modulation circuit in this case. FIG. 4E shows a constant-current circuit output. FIG. 4F shows an actual voltage change at the terminal $D_{y1}$. FIG. 4G shows the state of the emission current Ie.

When the constant current output in FIG. 4E was switched by the voltage pulse in FIG. 4D, and the voltage of the terminal $D_{y1}$ was monitored, it was found that the voltage was set to the constant voltage up to Vbe while the switch 30 was OFF, whereas constant-current driving was performed, and a current flowed in the selected emitter to generate a voltage (up to 7 V) while the switch 30 was ON. When the emission current Ie in FIG. 4G was observed at this time, it was found that current emission took place with an amplitude of 1 μA. In addition, the duration of a constant-current driving operation changed in accordance with the video signal intensity, thus performing gradation control.

In Example 1, the constant-current circuit has the arrangement shown in FIG. 3. However, the present invention is not limited to this circuit arrangement, and any circuit may be used as long as it can modulate the current to be supplied to each surface-conduction type electron emitter in accordance with the input signal. If, for example, a large output current is required, the transistor portions may be connected in the form of a Darlignton amplifier, or outputs may have a current mirror arrangement. In addition, constant-current diodes may be used in place of these voltage/current conversion type constant-current circuits.

In Example 1, as the switch, an emitter follower type switch having a high switching speed is constituted by pnp bipolar transistors. However, an emitter type switch may be constituted by npn bipolar transistors. Alternatively, if large currents are to be switched, transistors may be connected in the form of a Darlignton amplifier.

Arrangement of Display Panel and Manufacturing Method Therefor

The arrangement of the display panel of an image display apparatus to which the present invention is applied, and a manufacturing method therefor will be described in detail below.

Figure 5:
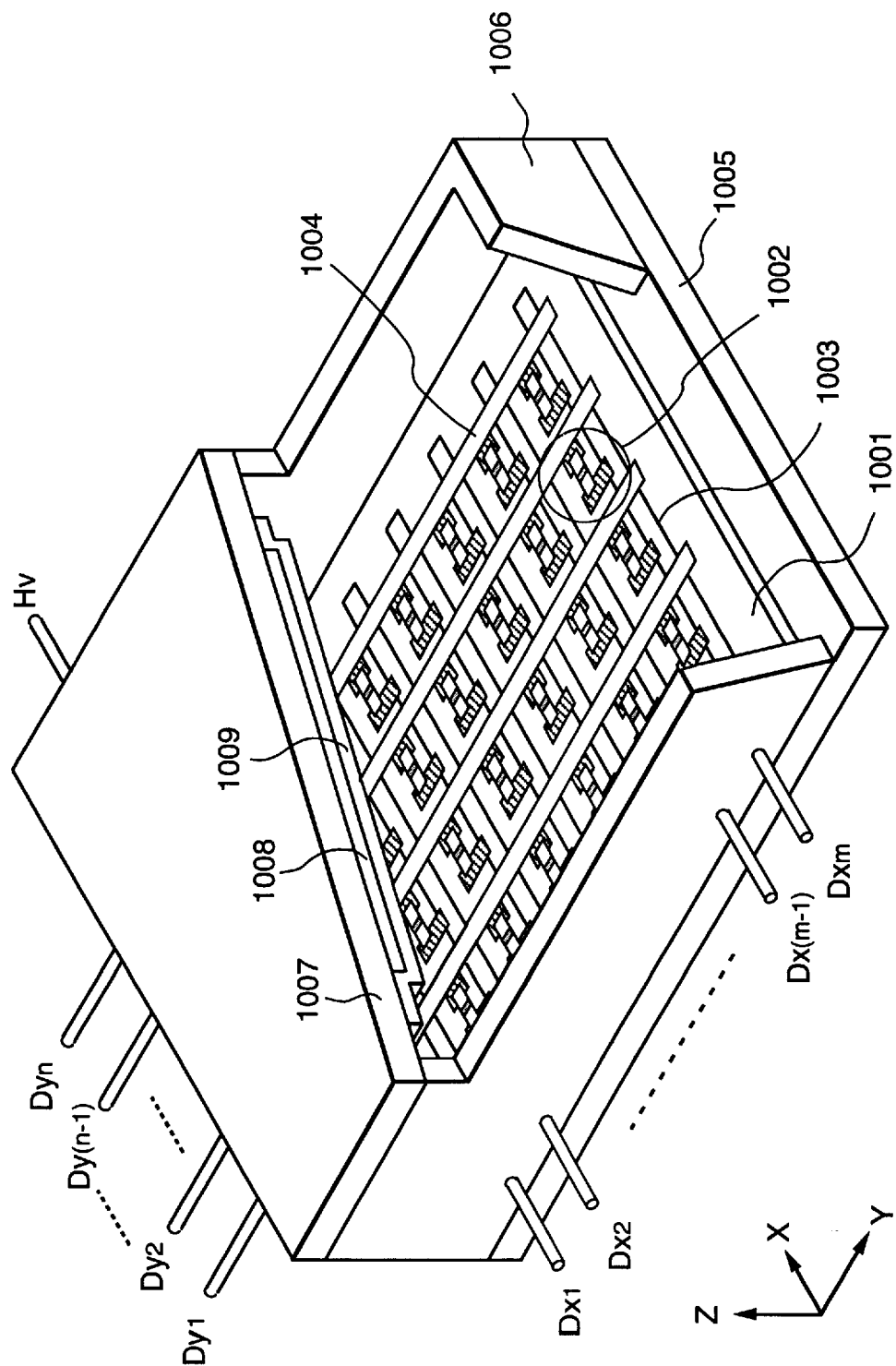
FIG. 5 is a perspective view showing a display panel.

FIG. 5 is a partially cutaway perspective view of the display panel used in Example 1, showing the internal structure of the panel.

Referring to FIG. 5, reference numeral 1005 denotes a rear plate; 1006, a side wall; and 1007, a faceplate. These parts form an airtight envelope for maintaining a vacuum in the display panel. To construct the airtight envelope, it is necessary to seal the respective parts to allow their junction portions to hold a sufficient strength and airtight condition. For example, frit glass is applied to the junction portions, and sintered at 400 to 500° C. in air or a nitrogen atmosphere for 10 minutes or more, thereby sealing the parts. A method of evacuating the airtight envelope will be described later.

The rear plate 1005 has a substrate 1001 fixed thereon, on which N×M surface-conduction type electron emitters 1002 are formed (M, N=positive integer equal to 2 or more, approximately set in accordance with the objective number of display pixels. For example, in a display apparatus for high-definition television display, preferably N=3,000 or more, M=1,000 or more). In Example 1, N=3,072, and M=1,024. The N×M surface-conduction type electron emitters are wired in the form of a simple matrix with M row wiring layers 1003 and N column wiring layers 1004. The portion constituted by these parts (1001 to 1004) will be referred to as a multi-electron source. Note that a manufacturing method and the structure of the multi-electron source will be described in detail later.

In Example 1, the substrate 1001 of the multi-electron source is fixed to the rear plate 1005 of the airtight envelope. However, if the substrate 1001 has sufficient strength, the substrate 1001 of the multi-electron source itself may be used as the rear plate of the airtight envelope.

Figure 6A:
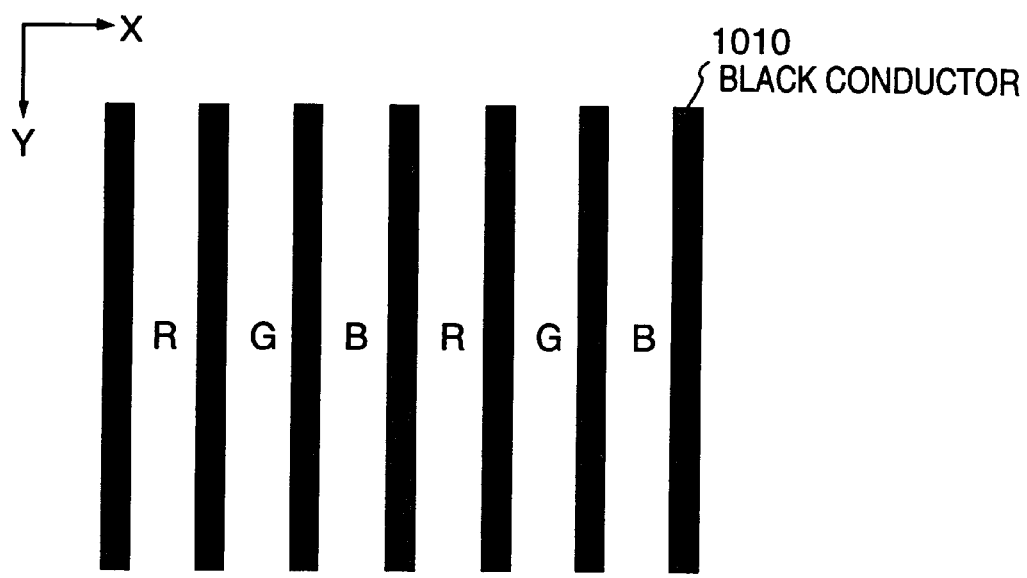
FIGS. 6A and 6B are views each showing the arrangement of phosphors on a faceplate.

Furthermore, a phosphor film 1008 is formed on the lower surface of the faceplate 1007. As Example 1 is a color display apparatus, the phosphor film 1008 is coated with red, green, and blue phosphors, i.e., three primary color phosphors used in the CRT field. As shown in FIG. 6A, R, G, and B phosphors are arranged in the form of stripes. Black conductors 1010 are provided between the stripes of the phosphors. The purpose of providing the black conductors

1010 is to prevent display color misregistration even if the electron-beam irradiation position is shifted to some extent, to prevent degradation of the display contrast by shutting off reflection of external light, to prevent charge-up of the phosphor film by electron beams, and the like. The black conductor 1010 mainly consists of graphite, however, any other materials may be used as long as the above purpose can be attained.

Figure 6B:
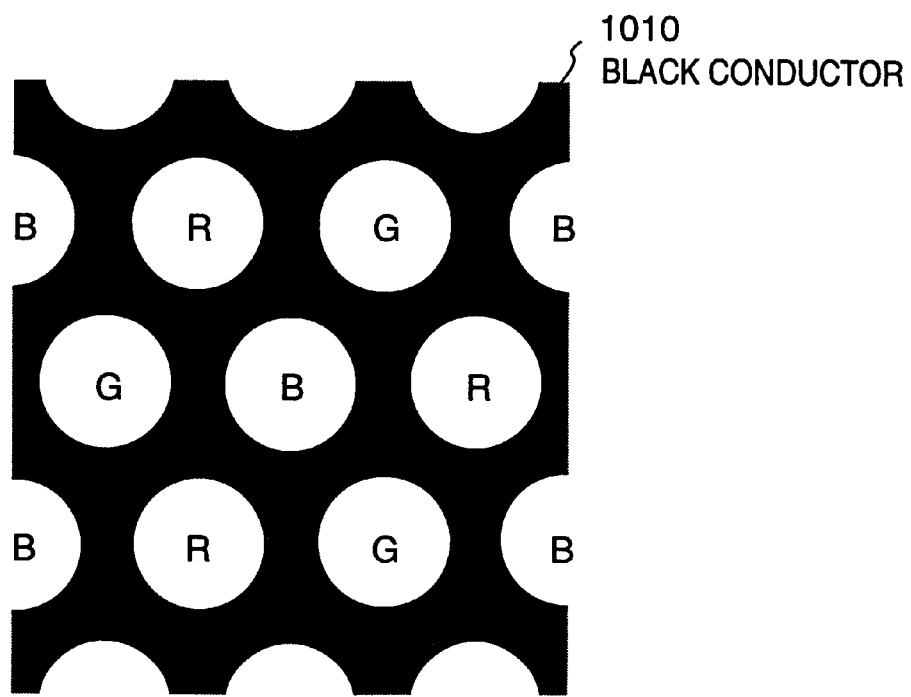

The arrangement of the three primary color phosphors is not limited to the stripe arrangement shown in FIG. 6A. For example, a delta arrangement like the one shown in FIG. 6B or other arrangements may be used.

When a monochrome display panel is to be formed, a monochrome phosphor material may be used for the phosphor film 1008, and a black conductive material need not always be used.

Furthermore, a metal back 1009, which is well-known in the CRT field, is provided on the rear-plate-side surface of the phosphor film 1008. The purpose of providing the metal back 1009 is to improve the light-utilization ratio by mirror-reflecting part of light emitted from the phosphor film 1008, to protect the phosphor film 1008 from bombardment of negative ions, to use the metal back 1009 as an electrode for applying an electron-beam accelerating voltage, to use the metal back 1009 as a conductive path for electrons which excited the phosphor film 1008, and the like. The metal back 1009 is formed by forming the phosphor film 1008 on the faceplate 1007, smoothing the front surface of the phosphor film, and depositing Al thereon by vacuum deposition. Note that when a phosphor material for a low voltage is used for the phosphor film 1008, the metal back 1009 is not used.

Furthermore, for application of an accelerating voltage or improvement of the conductivity of the phosphor film, transparent electrodes made of, e.g., ITO may be provided between the faceplate 1007 and the phosphor film 1008.

Reference symbols $D_{x1}$ to $D_{xm}$, $D_{y1}$ to $D_{yN}$, and $H_v$ denote electric connection terminals for an airtight structure provided to electrically connect the display panel to the electric circuit (not shown). The terminal $D_{x1}$ to $D_{xM}$ are electrically connected to the row wiring layers 1003 of the multi-electron source; the terminals $D_{y1}$ to $D_{yN}$, to the column wiring layers 1004; and the terminal $H_v$, to the metal back 1009 of the faceplate 1007.

To evacuate the airtight envelope, after forming the airtight envelope, an exhaust pipe and a vacuum pump (neither are shown) are connected, and the airtight envelope is evacuated to a vacuum of about $10^{-7}$ Torr. Thereafter, the exhaust pipe is sealed. To maintain the vacuum in the airtight envelope, a gettering film (not shown) is formed at a predetermined position in the airtight envelope immediately before/after the sealing. The gettering film is a film formed by heating and evaporating a gettering material mainly consisting of, e.g., Ba, by heating or RF heating. The adsorption effect of the gettering film maintains a vacuum of $1 \times 10^{-5}$ or $1 \times 10^{-7}$ Torr in the envelope.

The basic arrangement of the display panel of Example 1 and a manufacturing method therefor have been described above.

A method of manufacturing the multi-electron source used in the display panel according to Example 1 will be described next. In manufacturing the multi-electron source used in the image display apparatus of Example 1, any material, shape, and manufacturing method for a surface-conduction type electron emitter may be employed so long as it is for manufacturing an electron source having surface-conduction type electron emitters wired in the form of a simple matrix. However, the present inventors have found that among the surface-conduction type electron emitters, an emitter having an electron-emitting portion or its peripheral portion consisting of a fine particle film is excellent in electron-emitting characteristic and can be easily manufactured. Accordingly, such an emitter is the most appropriate emitter to be used for the multi-electron source of a high-luminance, large-screen image display apparatus. In the display panel of Example 1, surface-conduction type electron emitters each having an electron-emitting portion or its peripheral portion made of a fine particle film are used. First, the basic structure, manufacturing method, and characteristic of the preferred surface-conduction type electron emitter will be described, and the structure of the multi-electron source having many emitters wired in a simple matrix will be described later.

Structure Suitable for Surface-Conduction Type Electron Emitter and Manufacturing Method Therefor The typical structure of the surface-conduction type electron emitter having an electron-emitting portion or its peripheral portion made of a fine particle film includes a flat type structure and a stepped type structure.

Flat Surface-Conduction Type Electron Emitter

First, the structure of a flat surface-conduction type electron emitter and its manufacturing method will be described.

Figure 7A:
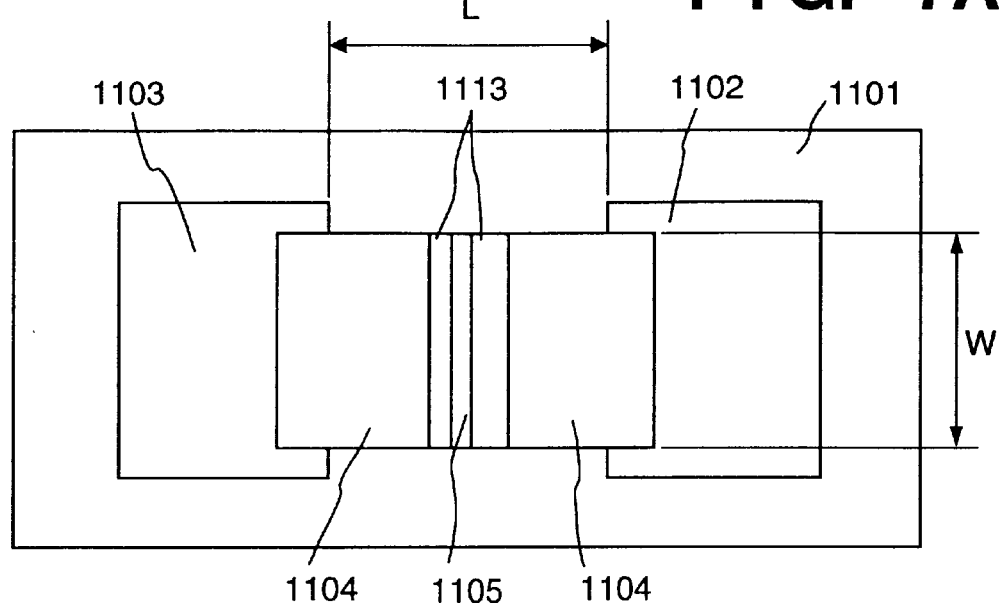
FIGS. 7A and 7B are plan and sectional views, respectively, showing a flat surface-conduction type electron emitter.
Figure 7B:
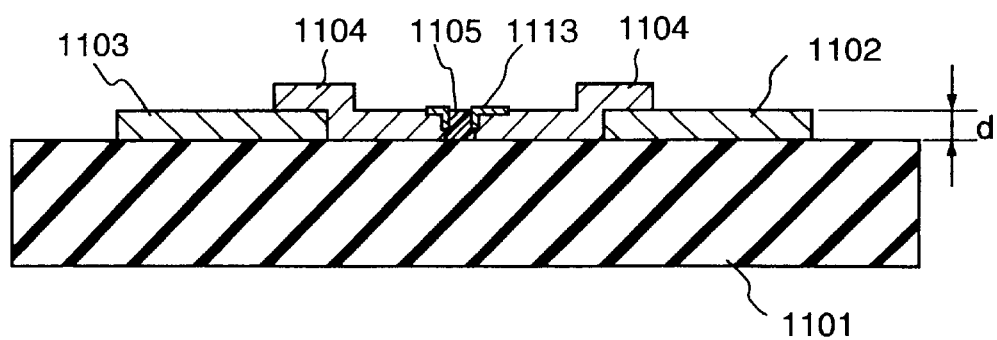

FIG. 7A is a plan view for explaining the structure of the flat surface-conduction type electron emitter; and FIG. 7B, a cross-sectional view of the emitter. Referring to FIGS. 7A and 7B, reference numeral 1101 denotes a substrate; 1102 and 1103, emitter electrodes; 1104, a conductive thin film; 1105, an electron-emitting portion formed by an energization forming process; and 1113, a thin film formed by an activation process.

As the substrate 1101, various glass substrates of, e.g., quartz glass and soda-lime glass, various ceramic substrates of, e.g., alumina, or any of those substrates with an insulating layer consisting of, e.g., $SiO_2$ and formed thereon can be employed.

The emitter electrodes 1102 and 1103 formed on the substrate 1101 to be parallel to its surface and oppose each other are made of a conductive material. For example, one of the following materials may be selected and used: metals such as Ni, Cr, Au, Mo, W, Pt, Ti, Cu, Pd, and Ag, alloys of these materials, metal oxides such as $In_2O_3$—$SnO_2$, and semiconductors such as polysilicon. These electrodes can be easily formed by the combination of a film-forming technique such as vacuum deposition and a patterning technique such as photolithography or etching, however, any other method (e.g., a printing technique) may be employed.

The shape of the electrodes 1102 and 1103 is appropriately designed in accordance with an application purpose of the electron emitter. Generally, the shape is designed by setting an interval L between electrodes to be an appropriate value in the range from several hundred Å to several hundred $\mu$m. The most preferable range for a display apparatus is from several $\mu$m to several ten $\mu$m. As for an electrode thickness d, an appropriate value is generally selected from the range from several hundred Å to several $\mu$m.

The conductive thin film 1104 is made of a fine particle film. The "fine particle film" is a film which contains a lot of fine particles (including island-like aggregates as constituent elements). Microscopic observation of the fine particle film will reveal that the individual particles in the film are spaced apart from each other, adjacent to each other, or overlap each other.

One particle has a diameter within the range from several Å to several thousand Å. Preferably, the diameter falls within the range from 10 Å to 200 Å. The thickness of the film is appropriately set in consideration of the following conditions: a condition necessary for electrical connection to the emitter electrode 1102 or 1103, a condition for the energization forming process to be described later, a condition for setting the electric resistance of the fine particle film itself to an appropriate value to be described later, and the like. More specifically, the thickness of the film is set in the range from several Å to several thousand Å, more preferably, 10 Å to 500 Å.

For example, materials used for forming the fine particle film are metals such as Pd, Pt, Ru, Ag, Au, Ti, In, Cu, Cr, Fe, Zn, Sn, Ta, W, and Pb, oxides such as PdO, $SnO_2$, $In_2O_3$, PbO, and $Sb_2O_3$, borides such as $HfB_2$, $ZrB_2$, $LaB_6$, $CeB_6$, $YB_4$, and $GdB_4$, carbides such as TiC, Zrc, HfC, TaC, SiC, and WC, nitrides such as TiN, ZrN, and HfN, semiconductors such as Si and Ge, and carbon. An appropriate material is selected from these materials.

As described above, the conductive thin film 1104 is formed using a fine particle film, and the sheet resistance of the film is set to fall within the range from $10^3$ to $10^7$ $\Omega$/sq.

As it is preferable that the conductive thin film 1104 is connected to the emitter electrodes 1102 and 1103 in an electrically good state, they are arranged so as to partly overlap each other. Referring to FIGS. 7A and 7B, the respective parts are stacked in the following order from the bottom: the substrate, the emitter electrodes, and the conductive thin film. This overlapping order may be: the substrate, the conductive thin film, and the emitter electrodes, from the bottom.

The electron-emitting portion 1105 is a fissure portion formed at a part of the conductive thin film 1104. The electron-emitting portion 1105 has a resistance higher than that of a peripheral conductive thin film. The fissure portion is formed by the energization forming process to be described later on the conductive thin film 1104. In some cases, particles, having a diameter of several Å to several hundreds Å, are arranged within the fissure portion. As it is difficult to exactly illustrate the actual position and shape of the electron-emitting portion, FIGS. 7A and 7B show the fissure portion schematically.

The thin film 1113, which consists of carbon or a carbon compound material, covers the electron-emitting portion 1105 and its peripheral portion. The thin film 1113 is formed by the activation process to be described later after the energization forming process.

The thin film 1113 is preferably made of monocrystalline graphite, polycrystalline graphite, amorphous carbon, or a mixture thereof, and its thickness is 500 Å or less, and more preferably 300 Å or less.

As it is difficult to exactly illustrate the actual position or shape of the thin film 1113, FIGS. 7A and 7B show the film schematically. FIG. 7A is a plan view showing the emitter in which a part of the thin film 1113 is removed.

The preferred basic emitter structure is described above. In Example 1, the following emitter is used in Example 1.

That is, the substrate 1101 consists of a soda-lime glass, and the emitter electrodes 1102 and 1103, an Ni thin film. The thickness d of the emitter electrodes is 1,000 Å and the electrode interval L is 2 $\mu$m.

As the main material for the fine particle film, Pd or PdO is used. The thickness and width W of the fine particle film are respectively set to about 100 Å and 100 $\mu$m.

A method of manufacturing a preferred flat surface-conduction type electron emitter will be described next.

FIGS. 8A to 8E are sectional views for explaining the manufacturing process of a surface-conduction type electron emitter. Note that the same reference numerals denote the same parts as in FIG. 7A.

Figure 8A:
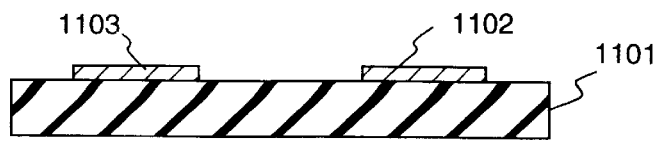
FIGS. 8A to 8E are sectional views showing a manufacturing process of a flat surface-conduction type electron emitter.

1) First, as shown in FIG. 8A, emitter electrodes 1102 and 1103 are formed on a substrate 1101.

In forming these electrodes, the substrate 1101 is fully cleaned with a detergent, pure water, and an organic solvent, and a material for the emitter electrodes is deposited on the substrate 1101. (As a depositing method, a vacuum film-forming technique such as deposition and sputtering may be used.) Thereafter, the deposited electrode material is patterned by a photolithographic etching technique. Thus, the pair of emitter electrodes 1102 and 1103 in FIG. 8A are formed.

Figure 8B:
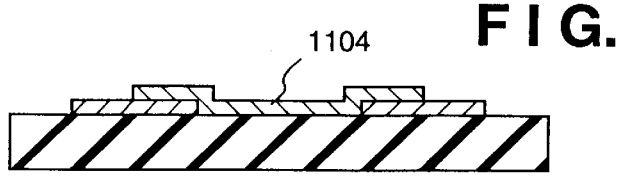

2) Next, as shown in FIG. 8B, a conductive thin film 1104 is formed. In forming the conductive thin film, an organic metal solution is applied to the substrate first, and the applied solution is then dried and sintered, thereby forming a fine particle film. Thereafter, the fine particle film is patterned into a predetermined shape by photolithographic etching. The organic metal solution means an organic metal compound solution containing a material for fine particles, used for the conductive thin film, as a main element. (More specifically, in Example 1, Pd is used as the main element. In Example 1, application of an organic metal solution is performed by the dipping method, however, the spinner method or spraying method may be employed.)

As a method of forming the conductive thin film made of fine particles, the application of an organic metal solution used in Example 1 can be replaced with any other method such as the vacuum deposition method, the sputtering method, or the chemical vapor deposition method.

Figure 8C:
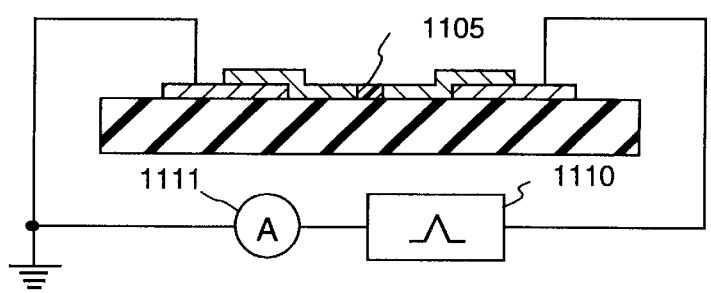

3) As shown in FIG. 8C, an appropriate voltage is applied between the emitter electrodes 1102 and 1103, from a power supply 1110 for the energization forming process, and the energization forming process is performed to form an electron-emitting portion 1105.

The energization forming process is a process of performing electric energization of the conductive thin film 1104 made of a fine particle film to appropriately destroy, deform, or denature a part of the conductive thin film, thereby changing the film into a structure suitable for electron emission. In the conductive thin film, the portion changed into a structure suitable for electron emission (i.e., the electron-emitting portion 1105) has an appropriate fissure in the thin film. Comparing the thin film having the electron-emitting portion 1105 with the thin film before the energization forming process, the electric resistance measured between the emitter electrodes 1102 and 1103 has greatly increased.

An electric energization method will be described in detail with reference to FIG. 9 showing an example of the waveform of an appropriate voltage applied from the power supply 1110. In forming a conductive thin film made of a fine particle film, a pulse-like voltage is preferably used. In Example 1, as shown in FIG. 9, a triangular pulse having a pulse width T1 is continuously applied at a pulse interval T2. In this case, a peak value Vpf of the triangular pulse is sequentially increased. Furthermore, a monitor pulse Pm is inserted between the triangular pulses at appropriate intervals to monitor the formed state of the electron-emitting portion 1105, and the current that flows upon insertion of the monitor pulse is measured by an ammeter 1111.

In Example 1, for example, in a $10^{-5}$ Torr vacuum atmosphere, the pulse width T1 is set to 1 msec; and the pulse interval T2, to 10 msec. The peak value Vpf is increased by 0.1 V per pulse. Each time five triangular pulses are applied, one monitor pulse Pm is inserted. To avoid adverse effects on the energization forming process, a voltage Vpm of the monitor pulse Pm is set to 0.1 V. When the electric resistance between the emitter electrodes 1102 and 1103 becomes $1\times10^{-6}$, i.e., the current measured by the ammeter 1111 upon application of the monitor pulse becomes $1\times10^{-7}$ A or less, the energization for the forming process is terminated.

Note that the above method is preferable for the surface-conduction type electron emitter of Example 1. In case of changing the design of the surface-conduction type electron emitter concerning, e.g., the material or thickness of the fine particle film, or the emitter electrode interval L, the conditions for energization are preferably changed in accordance with the change in the emitter design.

Figure 8D:
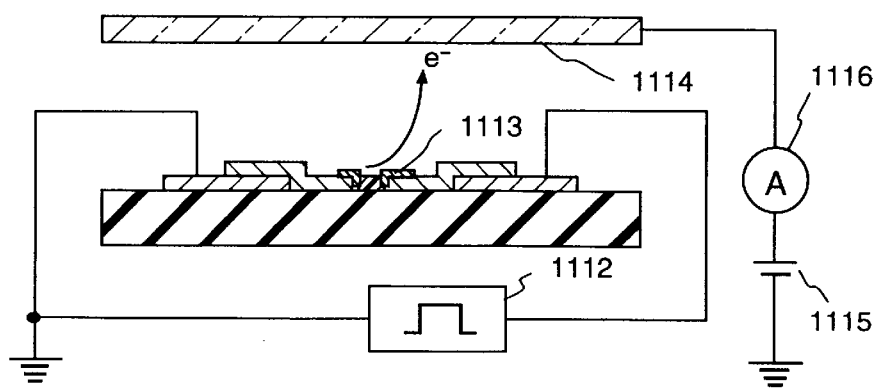

4) As shown in FIG. 8D, an appropriate voltage is applied next, from an activation power supply 1112, between the emitter electrodes 1102 and 1103, and the activation process is performed to improve the electron-emitting characteristic.

The activation process here is a process of performing energization of the electron-emitting portion 1105, formed by the energization forming process, under appropriate conditions, to deposit carbon or a carbon compound around the electron-emitting portion 1105. (FIG. 8D shows the deposited material of carbon or a carbon compound as a material 1113.) Comparing the electron-emitting portion with that before the activation process, the emission current at the same applied voltage can be increased typically 100 times or more.

The activation process is performed by periodically applying a voltage pulse in a $10^{-4}$ to $10^{-5}$ Torr vacuum atmosphere to deposit carbon or a carbon compound mainly derived from an organic compound existing in the vacuum atmosphere. The deposition material 1113 is any of monocrystalline graphite, polycrystalline graphite, amorphous carbon, and a mixture thereof. The thickness of the deposition material 62 is 500 Å or less, and more preferably, 300 Å or less.

Figure 10A:
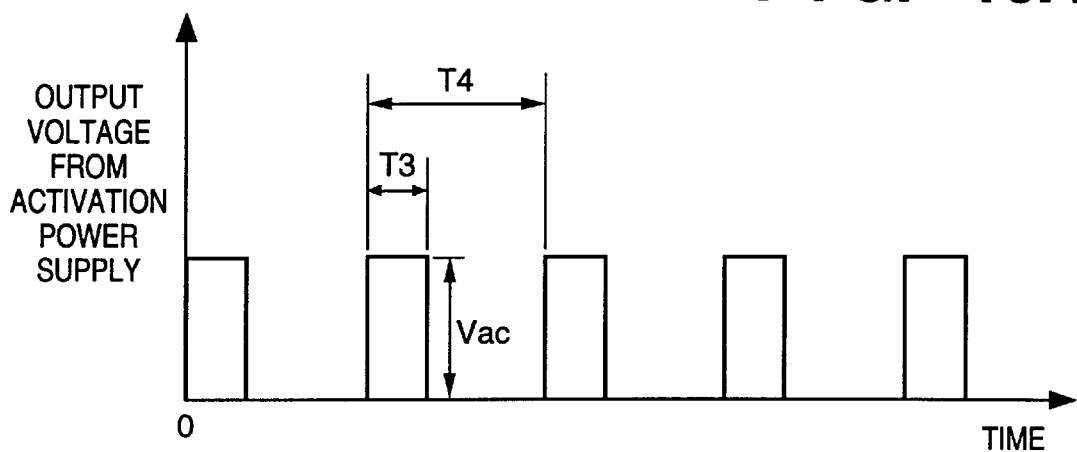
FIGS. 10A and 10B are timing charts activation voltages and emission currents.

FIG. 10A shows an example of the waveform of an appropriate voltage applied from the activation power supply 1112 to explain the energization method used for this operation. In this case, the activation process is performed by periodically applying a constant rectangular voltage. More specifically, a rectangular voltage Vac is set to 14 V; a pulse width T3, to 1 msec; and a pulse interval T4, to 10 msec. Note that the above energization conditions are preferable for the surface-conduction type electron emitter of Example 1. When the design of the surface-conduction type electron emitter is changed, the energization conditions are preferably changed in accordance with the change in emitter design.

Referring to FIG. 8D, reference numeral 1114 denotes an anode electrode, which is connected to a DC high-voltage power supply 1115 and an ammeter 1116, and adapted to capture an emission current Ie emitted from the surface-conduction type electron emitter. (Note that when the substrate 1101 is incorporated into the display panel before the activation process, the phosphor surface of the display panel is used as the anode electrode 1114.)

Figure 10B:
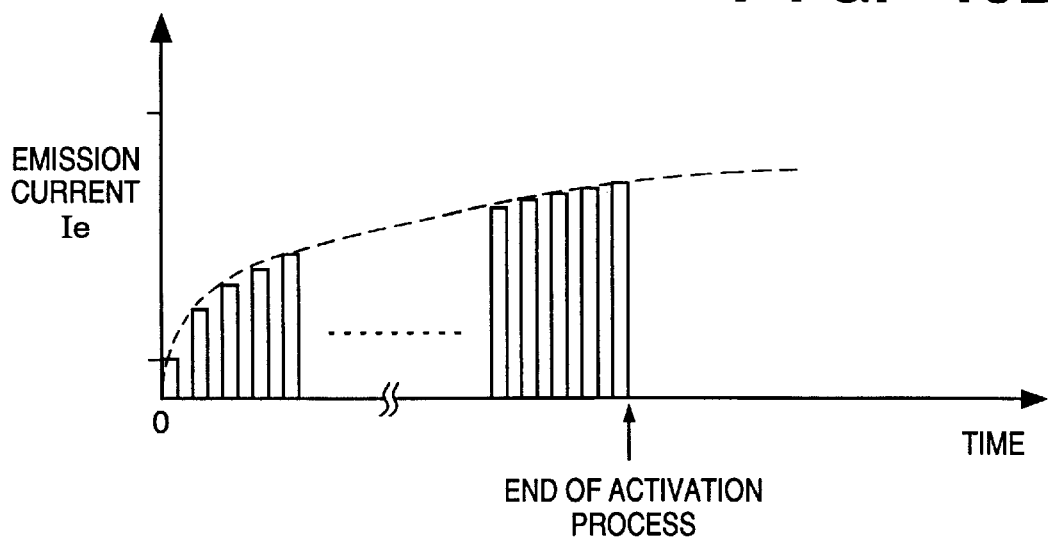

While applying a voltage from the activation power supply 1112, the ammeter 1116 measures the emission current Ie to monitor the progress of the activation process so as to control the operation of the activation power supply 1112. FIG. 10B shows an example of the emission current Ie measured by the ammeter 1116. As application of a pulse voltage from the activation power supply 1112 is started, the emission current Ie increases with the elapse of time, gradually reaches saturation, and hardly increases after being saturated. At the substantial saturation point, the voltage application from the activation power supply 1112 is stopped, and the activation process is then terminated.

Note that the above energization conditions are preferable for the surface-conduction type electron emitter of Example 1. When the design of the surface-conduction type electron emitter is changed, the conditions are preferably changed in accordance with the change in emitter design.

Figure 8E:
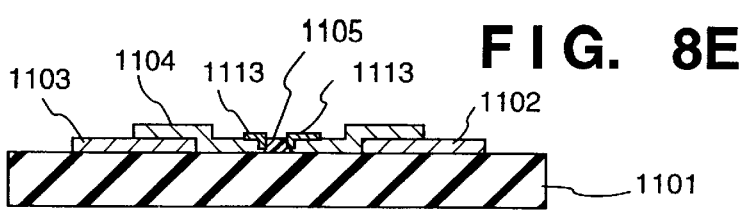

The flat surface-conduction type electron emitter shown in FIG. 8E is manufactured in the above manner.

Stepped Surface-Conduction Type Electron Emitter

Another typical structure of the surface-conduction type electron emitter having an electron-emitting portion or its peripheral portion made of a fine particle film, i.e., the structure of a stepped surface-conduction type electron emitter, will be described next.

Figure 11:
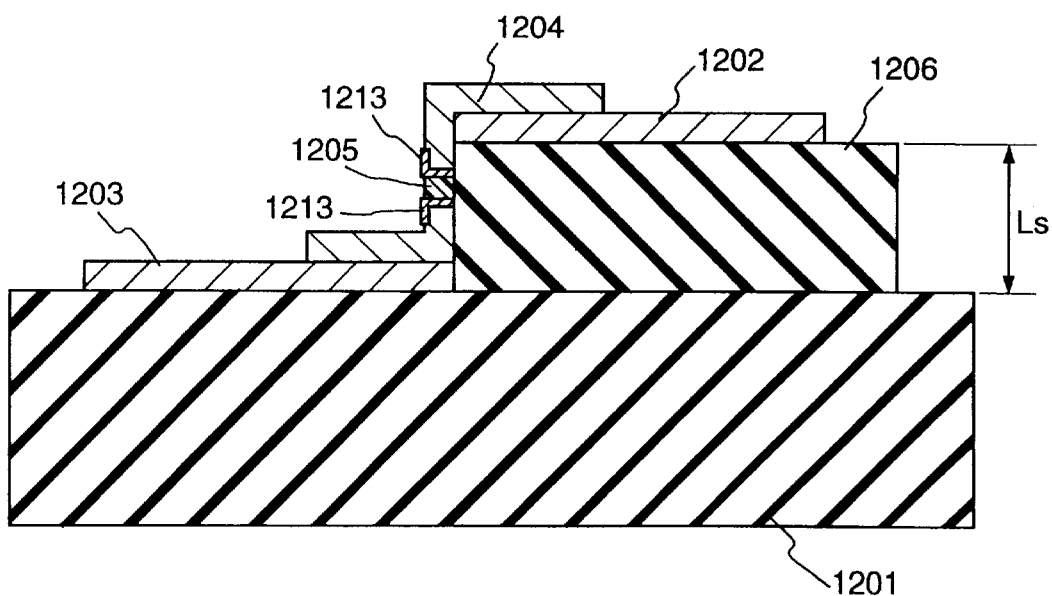
FIG. 11 is a sectional ugh showing a stepped surface-conduction type electron emitter.

FIG. 11 is a sectional view for explaining the basic structure of the stepped type. Referring to FIG. 11, reference numeral 1201 denotes a substrate; 1202 and 1203, emitter electrodes; 1206, a step forming member; 1204, a conductive thin film consisting of a fine particle film; 1205, an electron-emitting portion formed by the energization forming process; and 1213, a thin film formed by the activation process.

The stepped type is different from the flat type described above in that one (1202) of the emitter electrodes is formed on the step forming member 1206, and the conductive thin film 1204 covers the side surface of the step forming member 1206. In the plan views of FIGS. 7A and 7B, therefore, an emitter electrode interval L is set as a step height Ls of the step forming member 1206 in the stepped type. Note that the same materials as those listed in the description of the flat type can be used for the substrate 1201, the emitter electrodes 1202 and 1203, and the conductive thin film 1204 consisting of a fine particle film. An electrically insulating material such as $SiO_2$ is used for the step forming member 1206.

A method of manufacturing the stepped surface-conduction type electron emitter will be described next. FIGS. 12A to 12F are sectional views for explaining the manufacturing process. The same reference numerals in FIGS. 12A to 12F denote the same parts as in FIG. 11.

Figure 12A:
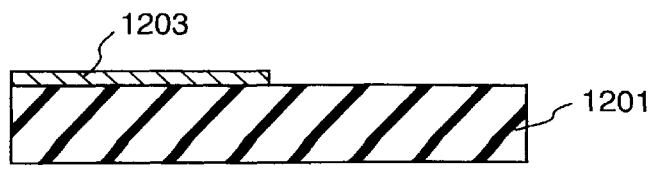
FIGS. 12A to 12F are sectional views showing a manufacturing process of a stepped surface-conduction type electron emitter.

1) As shown in FIG. 12A, an emitter electrode 1203 is formed on a substrate 1201.

Figure 12B:
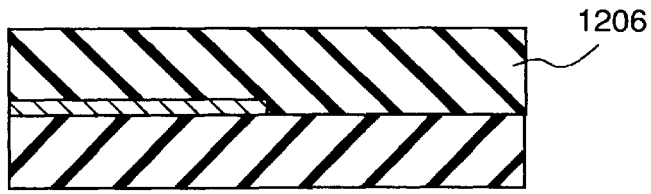

2) As shown in FIG. 12B, an insulating layer is stacked on the resultant structure to form a step forming member. For example, the insulating layer may be formed by depositing $SiO_2$ using the sputtering method. However, other film-forming techniques such as the vacuum deposition method and the printing method may be used.

Figure 12C:
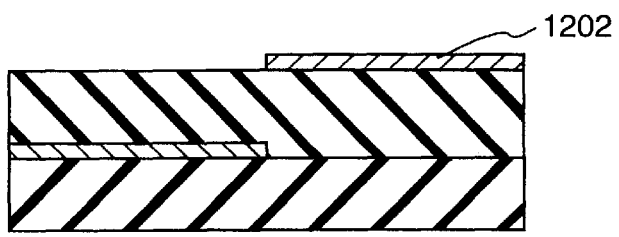

3) As shown in FIG. 12C, an emitter electrode 1202 is formed on the insulating layer.

Figure 12D:
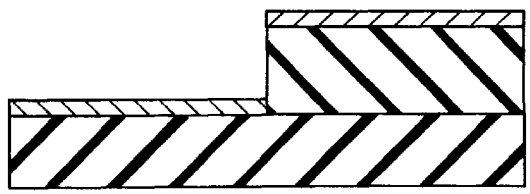

4) As shown in FIG. 12D, part of the insulating layer is removed by, e.g., an etching method to expose an emitter electrode 1203.

Figure 12E:
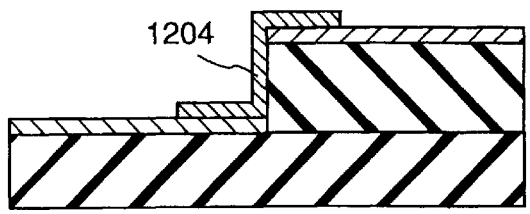

5) As shown in FIG. 12E, a conductive thin film 1204 is formed by using a fine particle film. This film may be formed by using a film-forming technique such as the coating method as in the case of the flat type described above.

6) As in the case of the flat type, the energization forming process is performed to form an electron-emitting portion (it suffices if the same energization forming process as that for the flat type described with reference to FIG. 8C is performed).

7) As in the case of the flat type, the activation process is performed to deposit carbon or a carbon compound near the electron-emitting portion (it suffices if the same activation process as that for the flat type described with reference to FIG. 8D is performed).

Figure 12F:
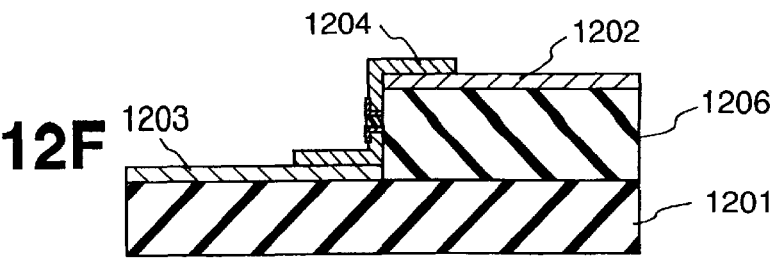

The stepped surface-conduction type electron emitter shown in FIG. 12F is manufactured in the above manner.

Characteristics of Surface-Conduction Type Electron Emitter Used in Display Apparatus The structures of the flat and stepped surface-conduction type electron emitters and their manufacturing methods have been described above. The characteristics of such an emitter used in a display apparatus will be described next.

Figure 13:
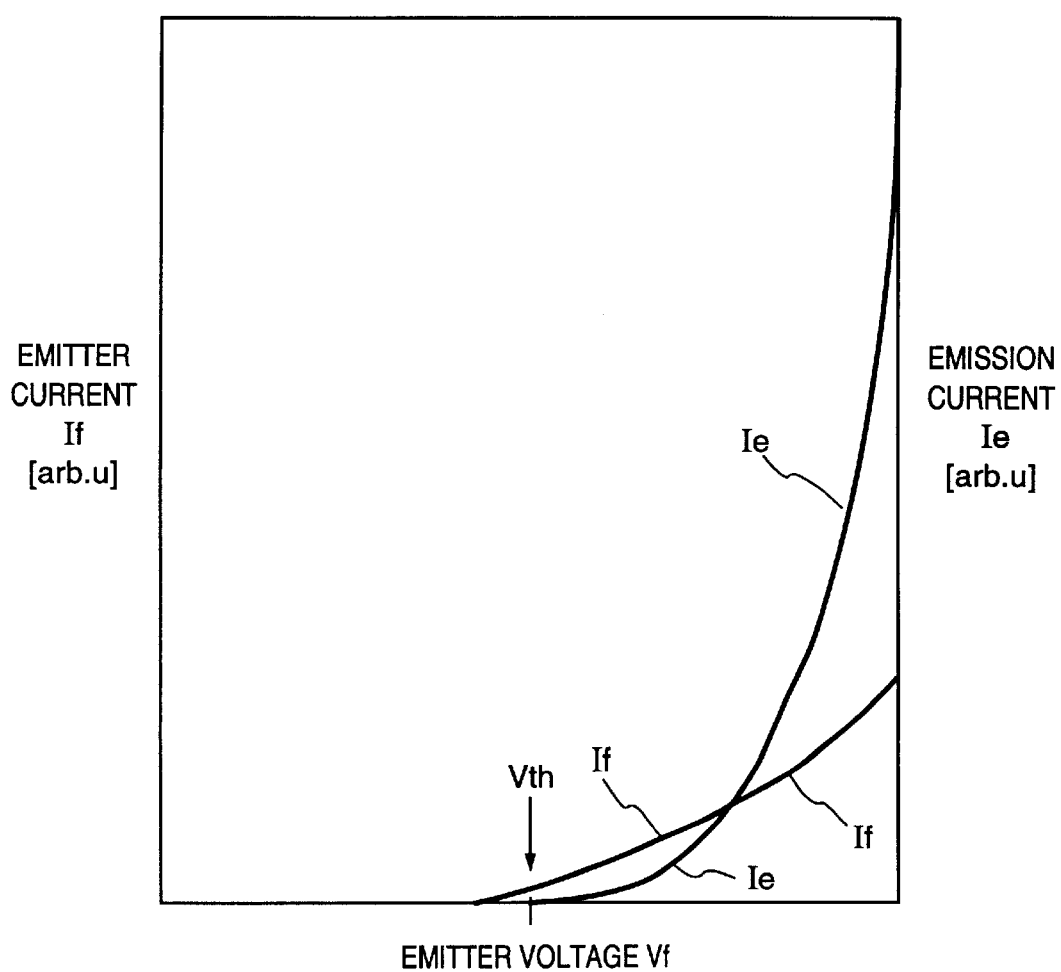
FIG. 13 is a graph showing voltage/current characteristics of a surface-conduction type electron emitter.

FIG. 13 shows typical examples of the (emission current Ie) to (emitter applied voltage Vf) characteristic and the (emitter current If) to (emitter applied voltage Vf) characteristic of the emitter used in the display apparatus. Note that compared with the emitter current If, the emission current Ie is very small, and hence it is difficult to illustrate the emission current Ie by the same measure as that for the emitter current If. In addition, these characteristics change upon changing design parameters such as the size and shape of the emitter. For these reasons, the two curves in FIG. 13 are respectively plotted in arbitrary units.

Regarding the emission current Ie, the emitter used in the display apparatus has the following three characteristics:

First, when a given voltage (referred to as a threshold voltage Vth) or more is applied to the emitter, the emission current Ie drastically increases. However, with a voltage lower than the threshold voltage Vth, almost no emission current Ie is detected.

That is, regarding the emission current Ie, the emitter has a nonlinear characteristic exhibiting a clear threshold voltage Vth.

Second, the emission current Ie changes depending on the voltage Vf applied to the emitter. Accordingly, the magnitude of the emission current Ie can be controlled by changing the voltage Vf.

Third, the emission current Ie is output quickly in response to application of the emitter voltage vf to the emitter. Accordingly, the charge amount of electrons to be emitted from the emitter can be controlled by changing the duration of application of the emitter voltage Vf.

The surface-conduction type electron emitter with the above three characteristics is conveniently applied to a display apparatus. For example, in a display apparatus having a large number of emitters arranged in correspondence with the pixels of the display screen, if the first characteristic is utilized, a display operation can be performed by sequentially scanning the display screen. This means that a voltage equal to or higher than the threshold voltage Vth is appropriately applied to a driven emitter, while a voltage lower than the threshold voltage Vth is applied to a non-selected emitter. In this manner, sequentially changing the driven emitters enables display by sequential scanning of the display screen.

Furthermore, the emission luminance can be controlled by utilizing the second or third characteristic. Gradation display can therefore be realized.

Structure of Multi-Electron Source Having Many Emitters Wired in Simple Matrix

The structure of a multi-electron beam source having the above surface-conduction type electron emitters arranged on a substrate and wired in a simple matrix will be described next.

Figure 14:
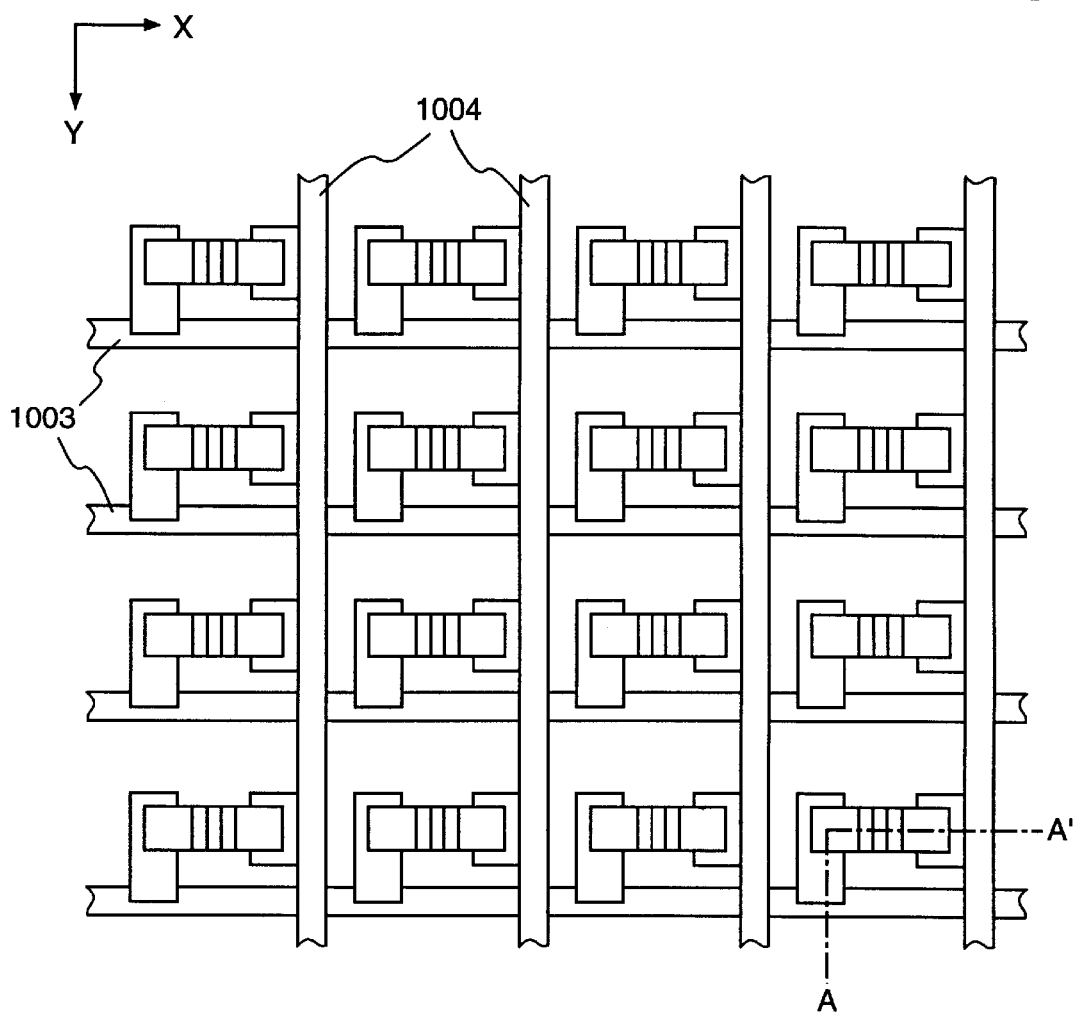
FIG. 14 is a plan view showing a multi-electron substrate.

FIG. 14 is a plan view showing a multi-electron source used for the display panel in FIG. 5. Emitters each identical to the one shown in FIGS. 7A and 7B are arranged on the substrate and connected to the row and column wiring layers 1003 and 1004 to be wired in a simple matrix. An insulating layer (not shown) is formed between the electrodes at each intersection between the row and column wiring layers to electrically insulate the wiring layers from each other.

Figure 15:
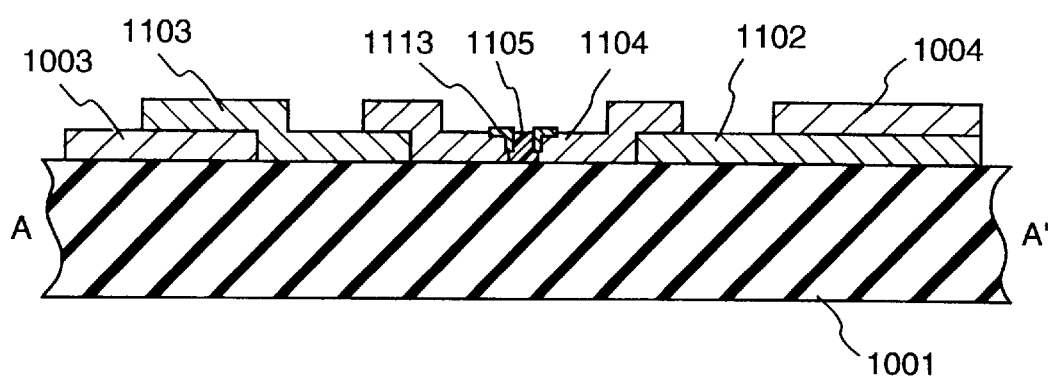
FIG. 15 is a partial sectional view showing a multi-electron substrate.
Figure 16:
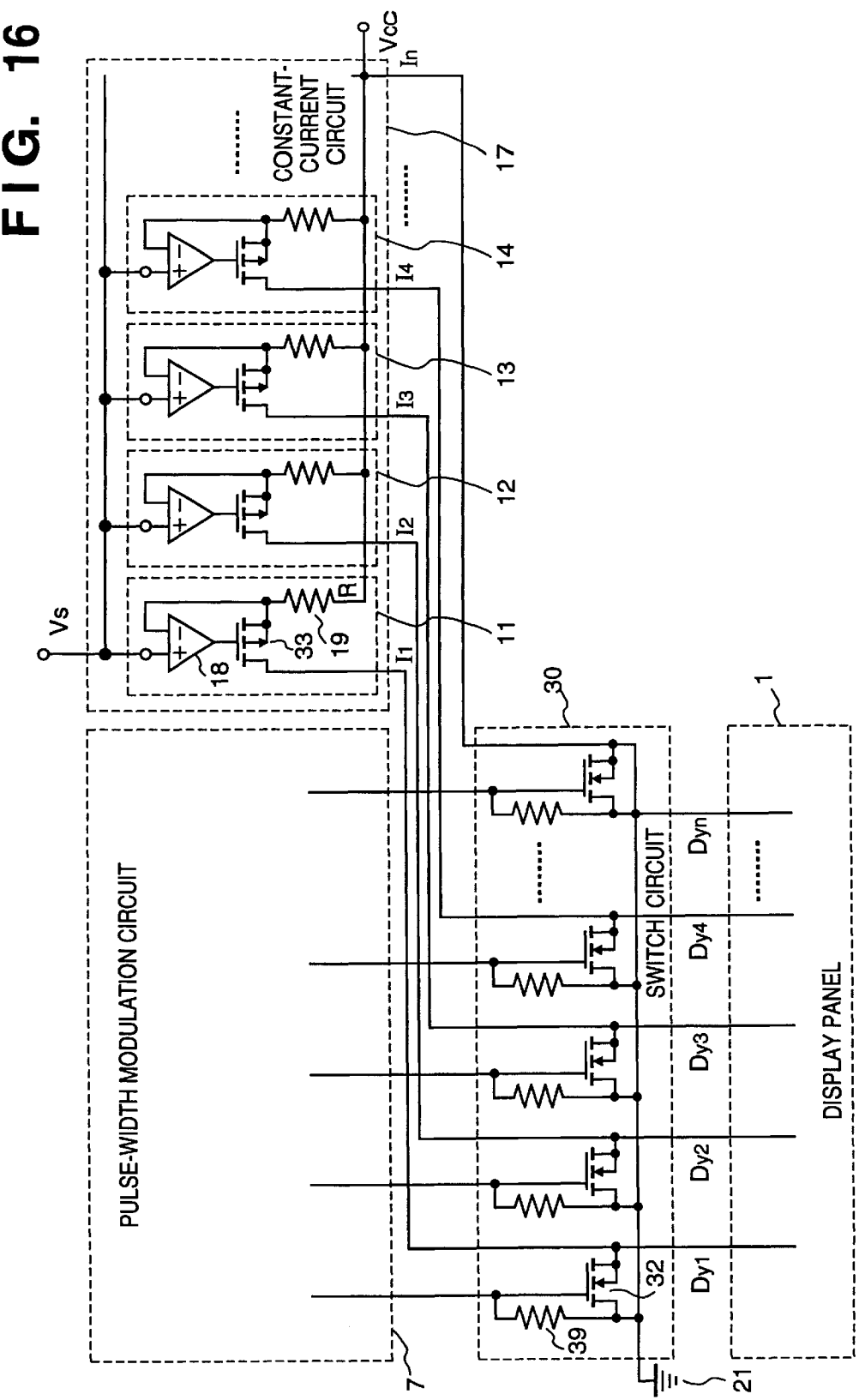
FIG. 16 is a circuit diagram showing switches and constant-current circuits in Example 2 of the present invention.

FIG. 15 is a sectional view taken along a line A-A' in FIG. 14.

The multi-electron source having the above structure is manufactured by forming row wiring layers 1003, column wiring layers 1004, insulating layers between the row wiring layers and the column wiring layers,(not shown), the emitter electrodes of the surface-conduction type electron emitters, and a conductive thin film on a substrate in advance, and the respective emitters are energized through the row and column wiring layers 1003 and 1004 to perform the energization forming process and the activation process.

EXAMPLE 2

Example 2 of the present invention will be described next with reference to FIGS. 16 and 17A to 17G.

The surface-conduction type electron emitters and panel structure of Example 2 are the same as those of Example 1, and the driving circuit is also the same as that shown in FIG. 2. For this reason, the arrangement of a switch 30 which is the main feature of Example 2 will be described below with reference to FIG. 16.

In Example 2, the source of each enhancement type nMOS transistor is grounded. The drain of each NMOS transistor is connected to a corresponding constant current output, and the source of each transistor is set to 0 V. The gate of each transistor is connected to a corresponding voltage pulse (PW1, PW1, . . . ) of a pulse-width modulation circuit output.

At this time, the gate potential is changed to turn on/off each MOS transistor so as to switch load currents, thereby switching the constant-current driving mode and the constant-voltage driving mode.

Figure 17A:
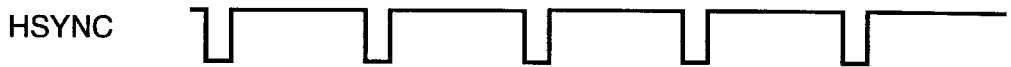
FIGS. 17A to 17G are timing charts associated with column wiring layer 1 in Example 2.
Figure 17B:
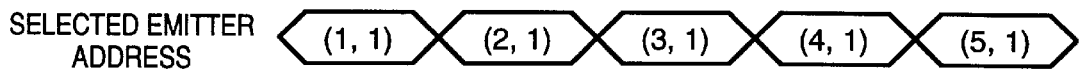
Figure 17C:
Figure 17D:
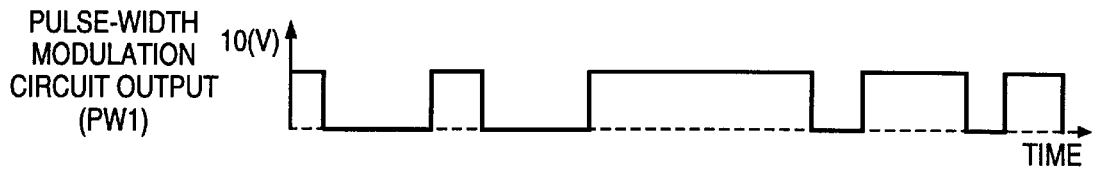
Figure 17E:
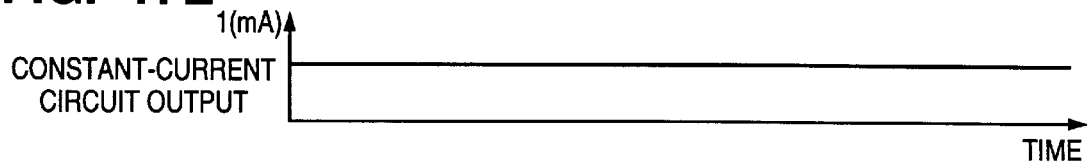
Figure 17F:
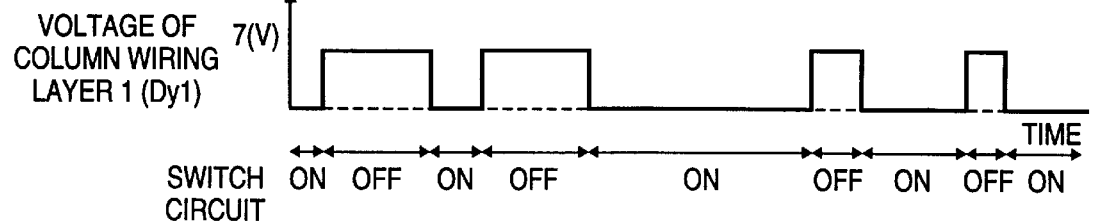
Figure 17G:
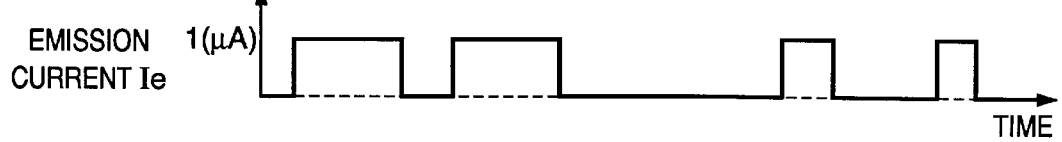

FIGS. 17A to 17G show the waveforms of actual outputs from the respective circuits. Assume that luminance video signals like those shown in FIGS. 17A to 17C are input to a drive line of interest, which is connected to a terminal $D_{y1}$ of a column wiring layer of a display panel 1, with time. FIG. 17D shows the waveform of a voltage drive pulse (PW1, PW2, . . . ) as an output from a pulse-height modulation circuit in this case. FIG. 17E shows a constant-current circuit output. FIG. 17F shows an actual voltage change at the terminal $D_{y1}$. FIG. 17G shows the state of an emission current Ie.

In the source-grounded type switch, since the gate potential and the output change in the opposite polarity directions, the voltage pulse has the opposite polarity to that in Example 1. In the source-grounded type switch, when each switch is turned on, the drain potential becomes almost equal to the source potential. That is, when the terminal $D_{y1}$ in FIG. 17F is monitored, it is found that the voltage is set to a constant voltage=0 V in the OFF state of the switch, whereas in the ON state of the switch, a current flows in the selected emitter upon constant-current driving, and a voltage (7 V) is generated. At this time, when the emission current Ie is observed, it is found that current emission takes place with an amplitude of 1 $\mu$A.

In comparison with the switch in which the emitter of each bipolar transistor is grounded, the nMOS source-grounded type switch can perform a high-speed switching operation because no base charge accumulating effect of a transistor occurs in a switching operation.

EXAMPLE 3

Example 3 of the present invention will be described next with reference to FIGS. 18, 19, and 20A to 20G. The surface-conduction type electron emitters and panel structure of Example 3 are the same as those of Example 1. For this reason, only a driving method and a driving circuit for an image display apparatus, which are the main features of the present invention, will be described below.

Figure 18:
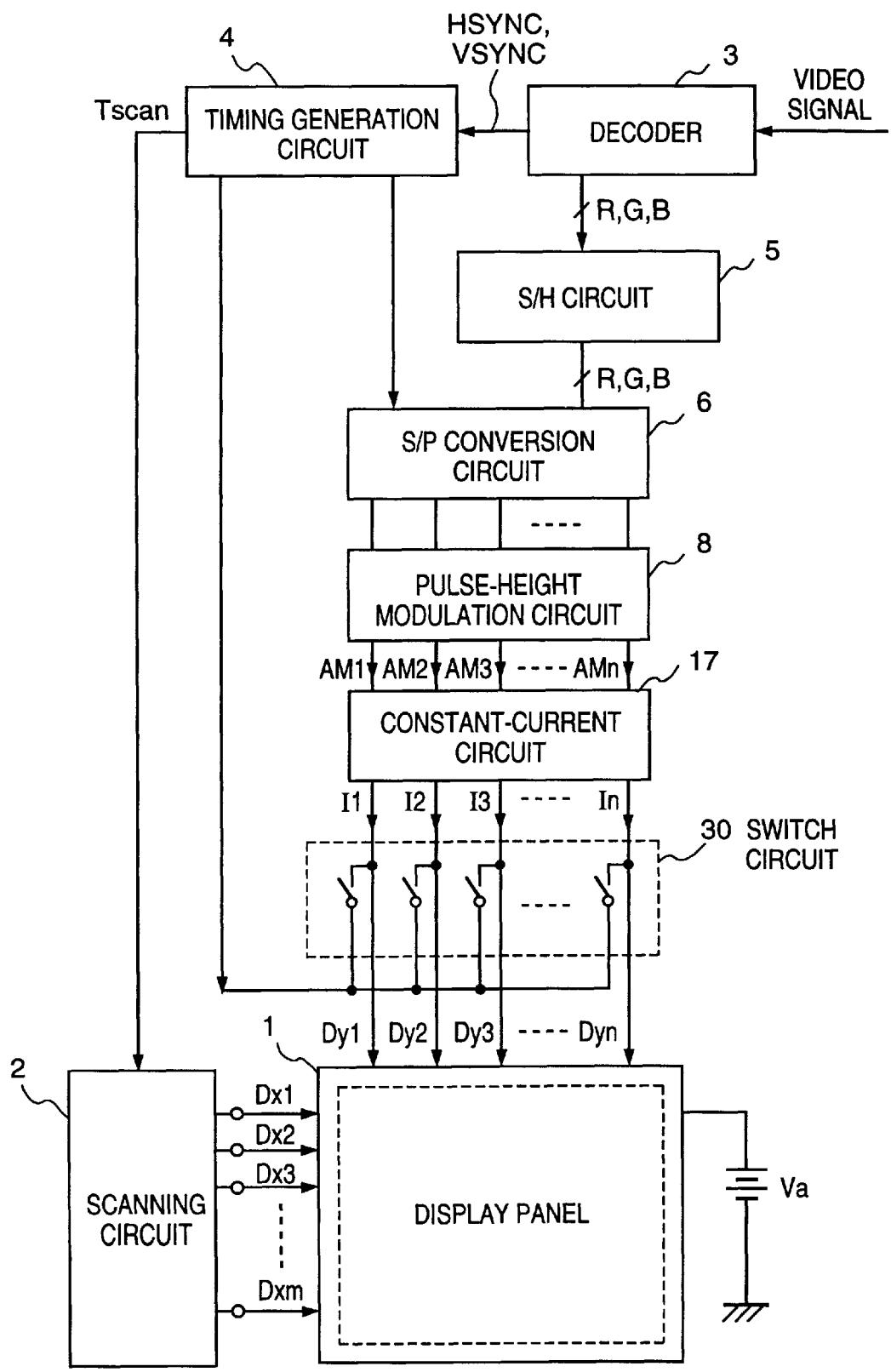
FIG. 18 is a block diagram showing the flow of a video signal in Example 3 of the present invention.

Referring to FIG. 18, reference numeral 1 denotes a display panel which is identical to the one in Example 1. A scanning circuit 2, a timing sinal generation circuit 4, a decoder 3, an S/H circuit 5, and the like are identical to those of Example 1.

Reference numeral 8 denotes a pulse-height modulation circuit for generating a voltage signal having an amplitude corresponding to output data from an S/P conversion circuit 6; and 17, a constant-current circuit for generating a current signal corresponding to an input voltage. The constant-current circuit 17 incorporates voltage/current conversion circuits (V/I conversion circuits). Example 3 has also a switch 30 for switching each current output from the constant-current circuit 17 between a constant current and a constant voltage.

In Example 3, gradation control is performed by generating a pulse having a predetermined voltage value, whose pulse height changes in accordance with the intensity of a video signal. Assume that when the video signal intensity reaches its peak, a current of 1 $\mu$A is emitted. In this case, according to Example 1, it is known that when a driving operation is performed with a current pulse having a peak value of 1 mA, a selected emitter is driven by a constant current of 0.7 mA, and electron emission of 1 $\mu$A takes place.

If the circuit constants of the constant-current circuit are Vcc=10 V and R=5 k$\Omega$, the pulse-height modulation circuit may generate an output voltage Vs=5 V. Gradation control of the display panel is performed by modulating output voltages (AM1, AM2, . . . ) from the pulse-height modulation circuit in accordance with the video signal intensity in this manner.

Figure 19:
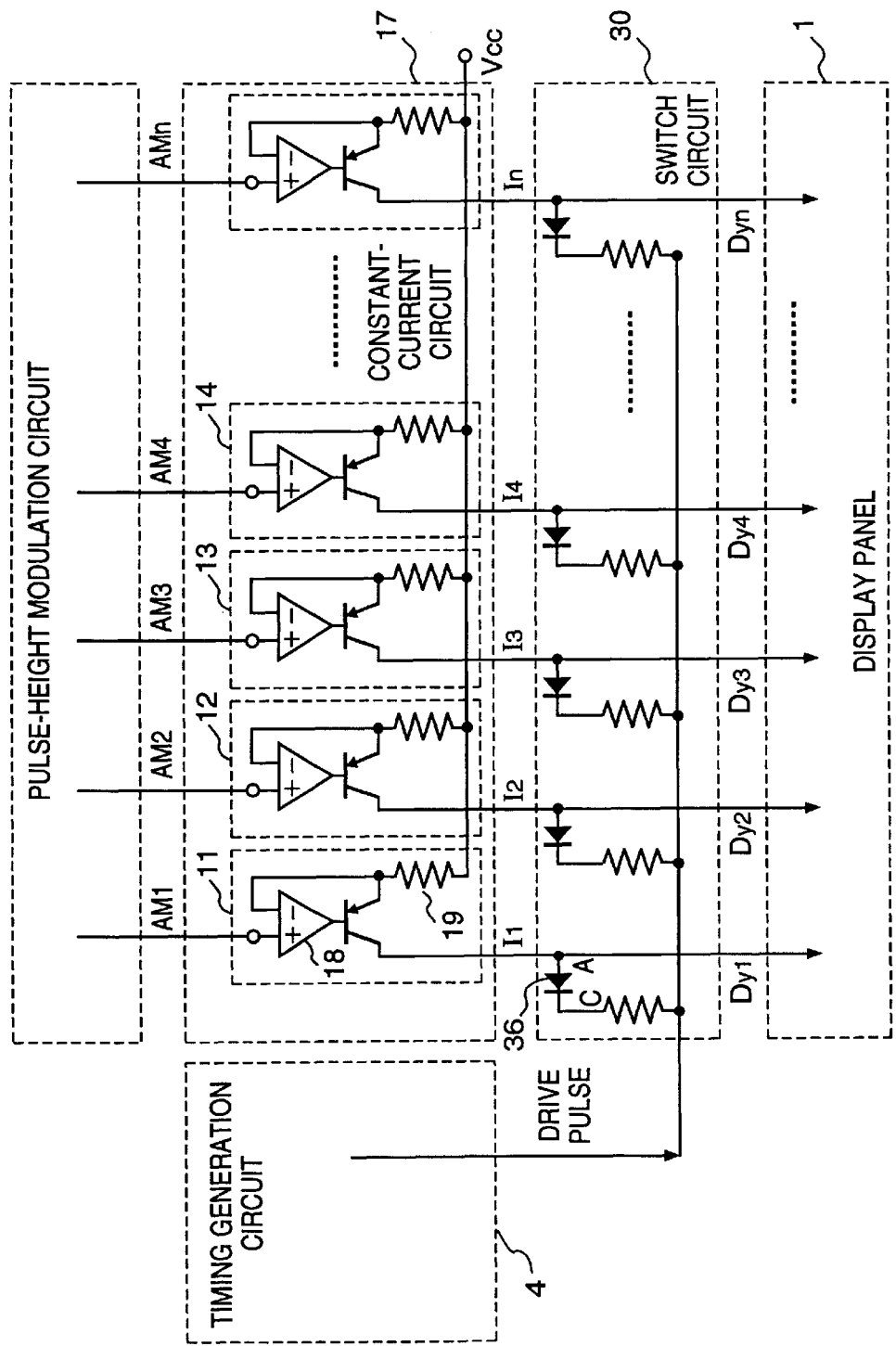
FIG. 19 is a circuit diagram showing switches and constant-current circuits in Example 3.

The switch 30 used in Example 3 will be described next. As shown in FIG. 19, Example 3 uses a diode 36 as a switch element. The anode (A) of each diode is connected to a current signal output, and the cathode potential is driven by a driven pulse between Vcc and 0 V, thereby switching the constant-current driving mode and the constant-voltage driving mode. More specifically, when the cathode voltage is 0 V, the diode is turned on to hold the drive line at a constant potential. In contrast to this, when the cathode potential is set to Vcc, the diode is turned off to set the constant-current driving mode.

In Example 3, since gradation control is performed by generating a pulse having a predetermined width which height changes in accordance with the intensity of a video signal, a current for driving each of the terminals $D_{y1}$ and $D_{yn}$ of the column wiring layers changes in accordance with the video signal. For this reason, the output of an amplitude modulation circuit must be changed in synchronism with a horizontal sync signal HSYNC of the video signal. At this time, the amplitude of the drive current also changes. However, when the amplitude is unstable before and after it changes, the constant-current driving mode is switched to the constant-voltage driving mode in response to the drive pulse so as not to drive the emitter. This operation prevents an abnormal voltage from being applied to the emitter. For this purpose, a timing generation circuit generates a pulse signal having a predetermined width and synchronized with the horizontal sync signal HSYNC, so the drive line is set in the constant-voltage driving mode to prevent abnormal turn-on operation while the set current changes.

Figure 20A:
FIGS. 20A to 20G are timing charts associated with column wiring layer 1 in Example 3.
Figure 20B:
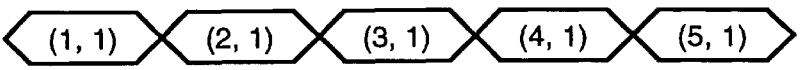
Figure 20C:
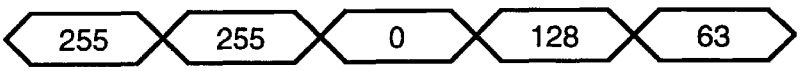
Figure 20D:
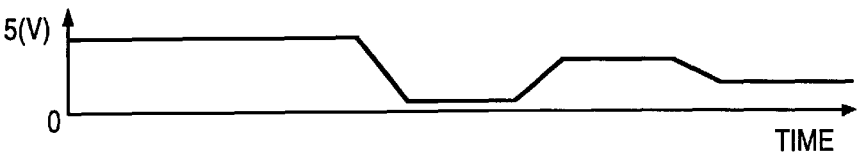
Figure 20E:
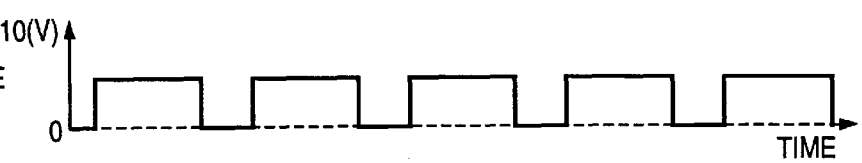
Figure 20F:
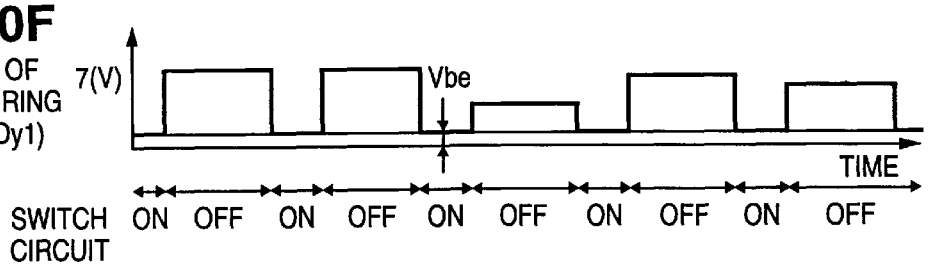
Figure 20G:

FIGS. 20A to 20G show the waveforms of actual outputs from the respective circuits. Assume that luminance video signals like those shown in FIGS. 20A to 20C are input to a drive line of interest, which is connected to a terminal $D_{y1}$ of a column wiring layer of the display panel 1, with time. FIG. 20D shows the waveform of a drive pulse (AW1, AW2, . . . ) as an output from a pulse-height modulation circuit in this case. FIG. 20E shows a drive pulse synchronized with the above horizontal sync signal. FIG. 20F shows an actual voltage change at the terminal $D_{y1}$. FIG. 20 shows the state of an emission current Ie.

A switching operation is performed in synchronism with the drive pulse in FIG. 20E. When the voltage of the terminal $D_{y1}$ is monitored, it is found that a constant voltage up to Vf (forward voltage drop amount) is set while a diode 36 is ON, whereas the constant-current driving mode is set to flow a current to the selected emitter to generate a voltage of up to 7 V while the diode 36 is OFF. At this time, when the emission current Ie in FIG. 20G was observed, it was found that when the video signal intensity reached its peak, current emission took place with an amplitude of 1 μA, and the emission current amount was modulated in accordance with the luminance data.

EXAMPLE 4

In Example 4, the potentials of the column wiring layers connected to emitters which are not to emit electrons are fixed by a circuit different from those in Examples 1 to 3. In addition, the potentials of the column wiring layers connected to emitters which are to emit electrons are set to be almost equal to the potentials of row wiring layers which are not scanned.

A driving method for a multi-electron source and an image display apparatus using the same have the following structure, as shown in, e.g., FIG. 21.

This apparatus includes a multi-electron source 1 having a simple matrix structure in which a pair of emitter electrodes of each surface-conduction type electron emitter 1002 are wired to row and column wiring layers, and a driving unit for generating a current signal by performing predetermined modulation on the basis of a drive signal, and driving the multi-electron source 1. A selected row wiring layer is fixed to a potential Vs, and each row wiring layer to which no scanning signal is applied is fixed to a potential Vns. In addition, the drive voltage to each column wiring layer applied with a modulation signal for an emitter which is on the selected wiring layer, to which the scanning signal has been applied, but is not to emit electrons is fixed to a potential Vg. In order to cause a constant-current circuit 17' to output a constant current Iout, a potential near a potential Ve is applied to the column wiring layer applied with the modulation signal for the emitter which is to emit electrons. In this case, the difference between the potentials Ve and Vns is the potential difference at which a desired electron emission amount can be obtained from the emitter. Both the differences between the potentials Vns and Vg and between the potentials Vg and Vs are set to be smaller than a threshold at which electron emission takes place. Furthermore, the potentials Vns and Ve are set to be equal to each other.

According to this arrangement, a potential near potential Ve–Vs is applied to each of the selected emitters on the row wiring layer to which the scanning signal is applied, of the emitters connected to the column wiring layers to which the selected emitters are connected, whereas a voltage of almost 0 V is applied to each of the non-selected emitters, i.e., the emitters on the wiring layers to which no scanning signal is applied. As a result, all the currents injected into the column wiring layers to drive the surface-conduction type electron emitters flow to the emitters which are to emit electrons, but are not shunted to the remaining emitters. Each emitter can therefore be driven with a constant current without considering a sum total Ifn of currents in the semi-selected state, and a nonuniform electron emission distribution caused by wiring resistances can be compensated by a simple circuit. This is one of the advantageous points of this embodiment.

A driving method for an image display apparatus according to Example 4 will be described next.

The arrangement of the image display apparatus including surface-conduction type electron emitters will be described first with reference to FIG. 22.

Figure 22:
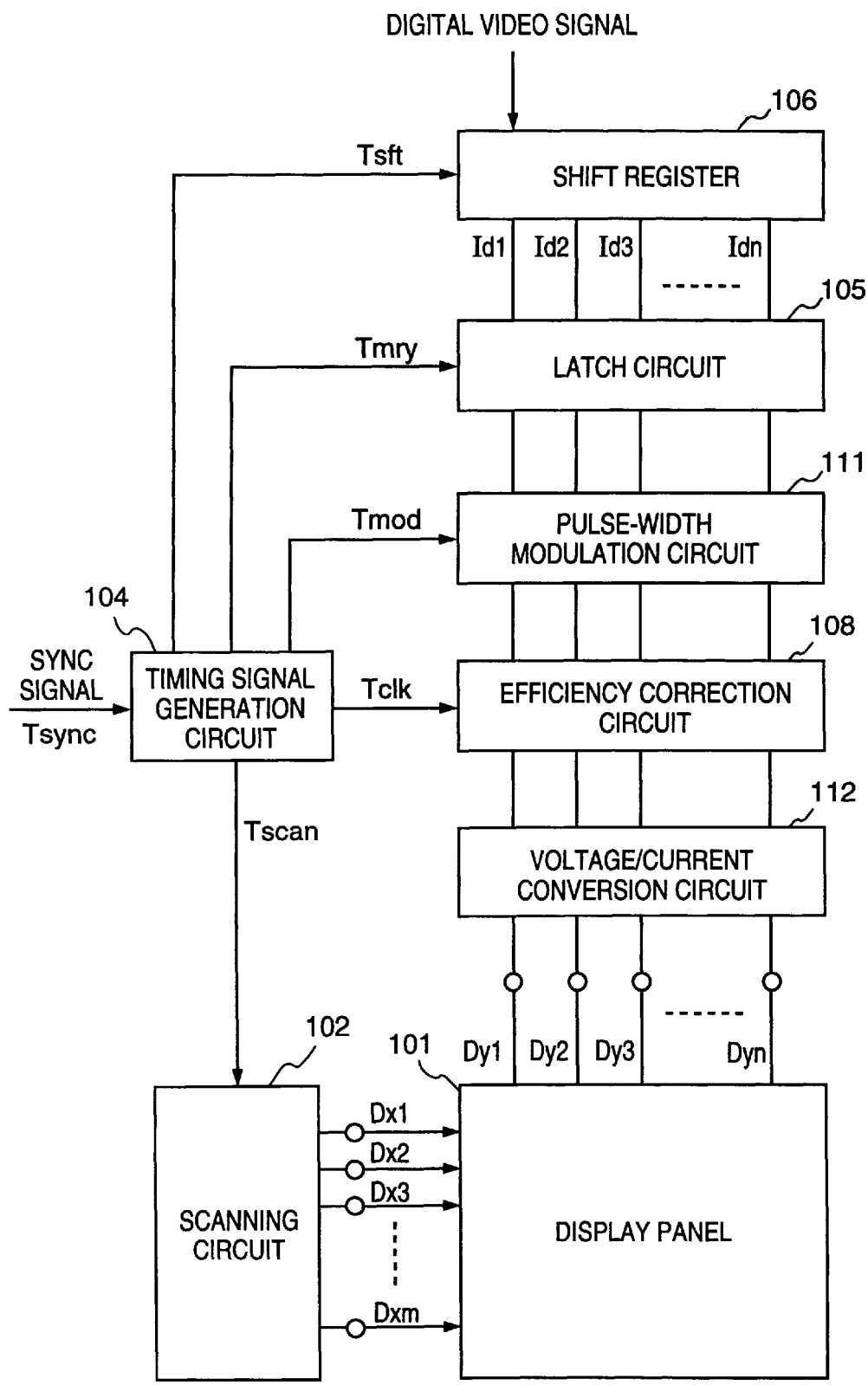
FIG. 22 is a block diagram showing the driving circuit according to Example 4.

Referring to FIG. 22, reference numeral 101 denotes a display panel connected to an external electric circuit via terminals $D_{x1}$ to $D_{xm}$ and $D_{y1}$ to $D_{yn}$. The high-voltage terminal of the faceplate is connected to an external high-voltage source Va to accelerate emission electrons (not shown). A scanning signal for sequentially driving the multi-electron source in the above panel, i.e., the surface-conduction type electron emitters wired in the form of an m (row)×n (column) matrix in units of rows is applied to each of the terminals $D_{x1}$ to $D_{xm}$.

Meanwhile, a modulation signal for controlling an output electron beam from each surface-conduction type electron emitter on a row selected by the scanning signal is applied to each of the terminals $D_{x1}$ to $D_{xm}$.

Figure 23:
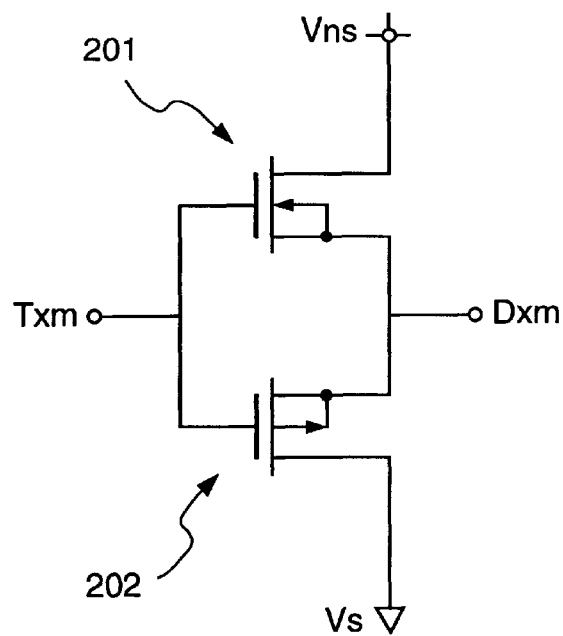
FIG. 23 is a circuit diagram showing a push-pull structure in a scanning circuit.
Figure 24:
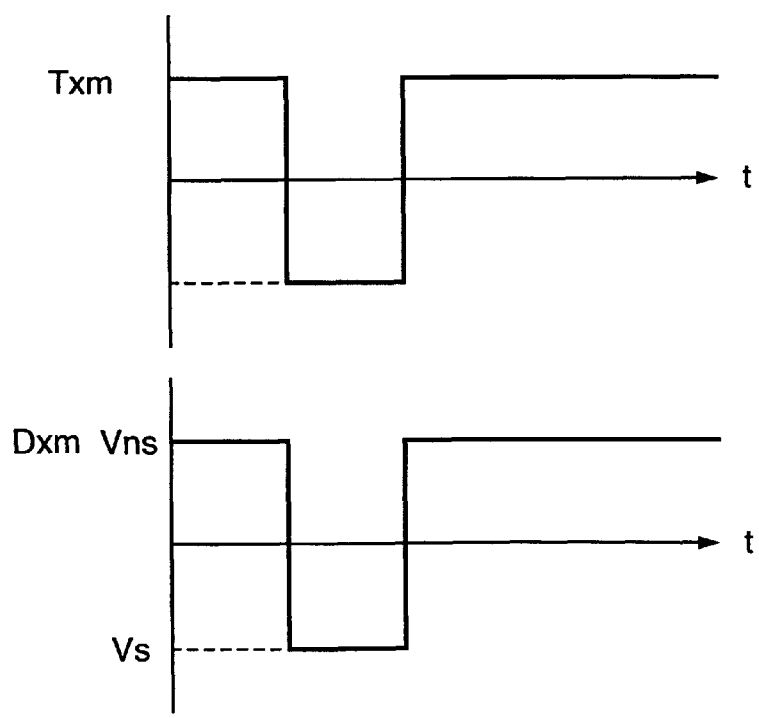
FIG. 24 is a timing chart for the circuit in FIG. 23.

A scanning circuit 102 will be described next. This circuit incorporates m switching elements. Each switching element selects one of the two output voltages Vs and Vns from the DC voltage source (not shown), and is electrically connected to one of the terminals $D_{x1}$ to $D_{xm}$ of the display panel 101. Each switching element operates on the basis of a control signal Tscan output from a timing generation circuit (to be described later). In practice, for example, with a combination of switching elements such as FETs, each switching element can be easily realized by a push-pull structure like the one shown in FIG. 23. As shown in FIG. 24, an output Dxm is switched between two values, i.e., the potentials Vs and Vns in synchronism with a timing signal Txm generated from the control signal Tscan and corresponding to each row wiring layer.

Note that the above DC power supply voltage Vs is set to –7 V on the basis of the characteristics (an electron emission threshold voltage of 8 V) of a surface-conduction type electron emitter in FIG. 13 which has been described above. If the current to be supplied to a column wiring layer is 0.5 to 1 mA, the corresponding applied voltage is about 7.5 to 8 V. Therefore, the voltage Vns=7.5 V is applied to each non-selected row wiring layer. With this operation, the drive voltage applied to each non-selected emitter becomes lower than the electron emission threshold voltage.

The flow of an input image signal will be described next. The input composite image signal is separated by a decoder into luminance signals of three primary colors and horizontal and vertical sync signals (HSYNC and VSYNC). A timing signal generation circuit 104 generates various timing signals synchronized with the horizontal and vertical sync signals HSYNC and VSYNC. The R, G, and B luminance signals are sampled by an S/H circuit or the like at a proper timing. The held signals are converted by a shift register circuit 106 into parallel image signals, in units of rows, which are arranged in the order corresponding to the arrangement of the respective phosphors of the image formation panel. The parallel image signals are then stored in a latch circuit 105.

The signals are converted by a pulse width modulation circuit 111 into pulse signals each having a pulse width corresponding to the image signal intensity. An efficiency correction circuit 108 generates drive pulses whose pulse heights reflect variations in the emission current amount/supply current amount efficiencies of the respective emitters. Each drive pulse is converted by a voltage/current conversion circuit 112 from a voltage amount to a current amount. In forming an image, each current output is supplied to a corresponding surface-conduction type electron emitter in the display panel 101 via one of the terminals $D_{y1}$ to $D_{yn}$ of the display panel. In the panel to which the current output pulse is supplied, only the surface-conduction type electron emitter connected to a row selected by the scanning circuit 102 emits electrons for a period of time corresponding to the pulse width of the supplied pulse signal, thereby causing a corresponding phosphor to emit light. When the scanning circuit 102 sequentially scans selected rows, a two-dimensional image is formed.

The voltage/current conversion circuit 112 will be described next. The voltage/current conversion circuit 112 is a circuit for controlling the current flowed to each surface-conduction type electron emitter in accordance with the amplitude of an input voltage signal. The voltage/current conversion circuit 112 has voltage/current converters (FIG. 25) equal in number to the column wiring layers and used for input signals. The outputs of the voltage/current converters are respectively connected to the terminals $D_{y1}$, $D_{y2}$, $D_{y3}$, . . , $D_{yn}$ of the display panel. Each voltage/current converter 112 is constituted by a constant-current circuit based on a current mirror circuit like the one shown in FIG. 26. Referring to FIG. 26, reference numeral 2002 denotes an operational amplifier; 2005, an npn transistor; 2003, a pnp transistor; 2006, a MOSFET; and 2004, a resistor (resistance value R). According to the circuit shown in FIG. 26, a current Iout to be output is determined in accordance with the amplitude of an input voltage signal Vin, and the amplitude and the current have the following relationship:

$$Iout=Vin/R$$

By setting proper design parameters for the voltage/current conversion circuit, the current Iout flowed to each surface-conduction type electron emitter can be controlled in accordance with the voltage signal.

In the circuit shown in FIG. 26, when the input voltage Vin is equal to or lower than Vref, the MOSFET 2006 as a switch in the present invention is turned on by the operational amplifier 2002, and the output voltage to the column wiring layer is set to Vg. As a result, the potential of each of the column wiring layers connected to the emitters which are not to be turned on is fixed. With this operation, the emitters on each column wiring layer corresponding to the emitters which are not to be turned on are set in the semi-selected state regardless of whether the emitters are connected to selected or non-selected rows.

Figure 27A:
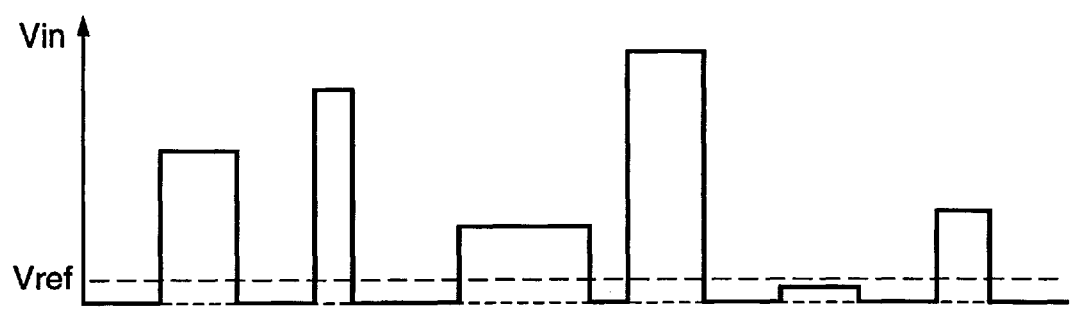
FIGS. 27A to 27C are timing charts of Example 4.
Figure 27B:
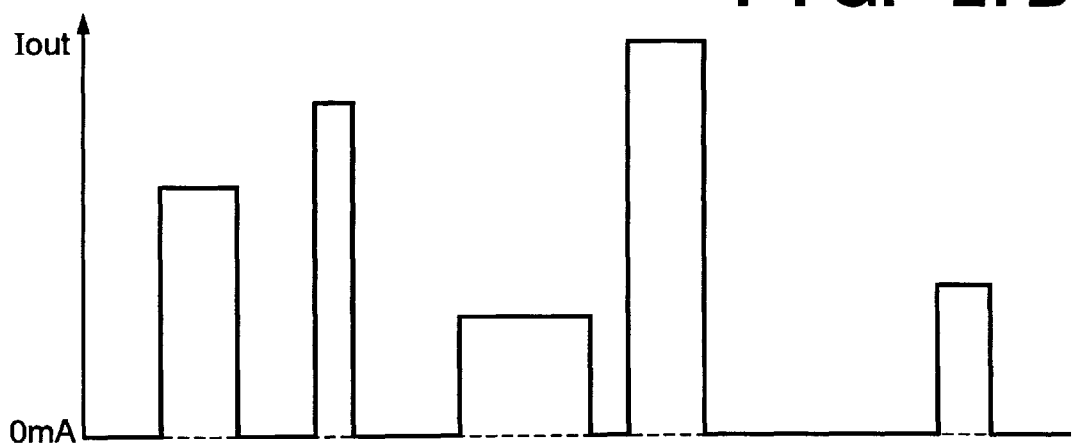
Figure 27C:
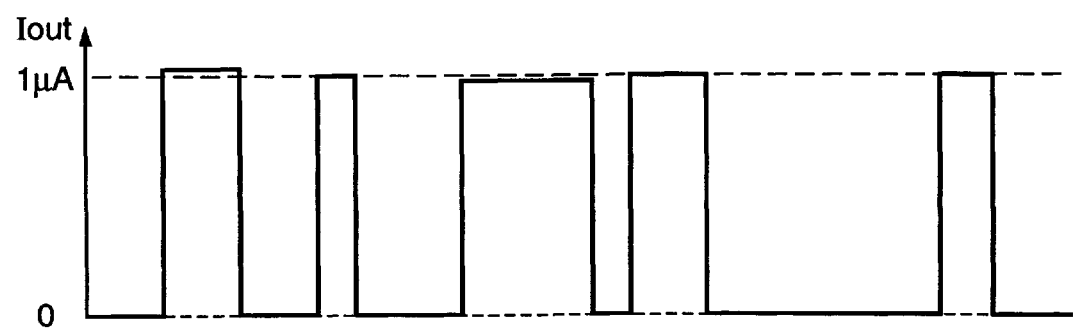

FIGS. 27A to 27C show how an input waveform from the modulation circuit is actually converted into a current waveform. Consider the column wiring layer $D_{y1}$ of the display panel. Assume that a voltage pulse having a pulse width modulated with luminance data like the one shown in FIG. 27A and a pulse height modulated with correction of the electron emission efficiency of each emitter is input to the corresponding drive line with time. FIG. 27B shows the waveform of an emitter current If output from the voltage/current conversion circuit at this time. FIG. 27C shows the state of the emission current Ie. As shown in FIGS. 4A to 4G, variations in emitter characteristics are corrected with the peak values of drive current pulses. When the emission current Ie is observed, it is found that the emission currents from all the emitters are set to 1 μA.

According to Example 4, since an emitter current flowing in each surface-conduction type electron emitter is modulated by the voltage/current conversion circuit, voltage drops across wiring resistances and the like can be compensated. In addition, the currents shunted to semi-selected emitters with an increase in the number of emitters can be minimized. An image can therefore be displayed with luminances very faithful to an original image signal throughout the display screen.

Figure 25:
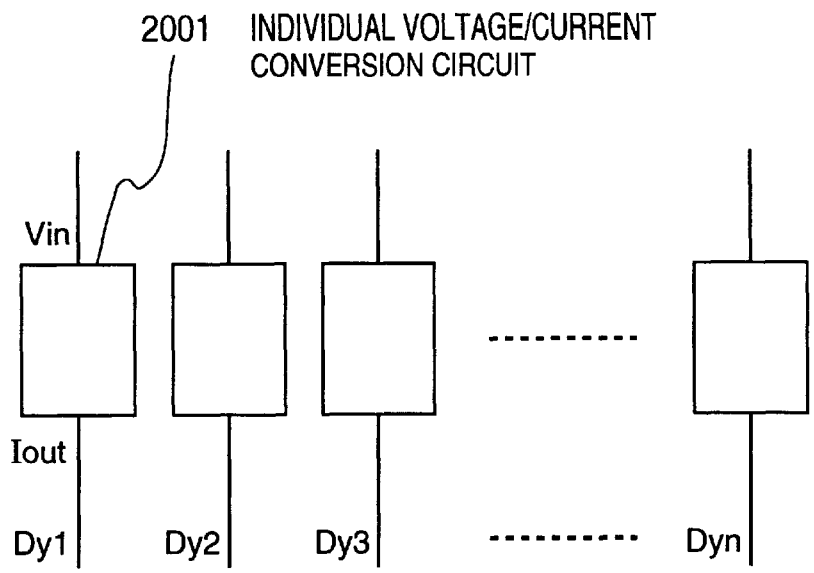
FIG. 25 is a block diagram showing a V/I conversion circuit.
Figure 26:
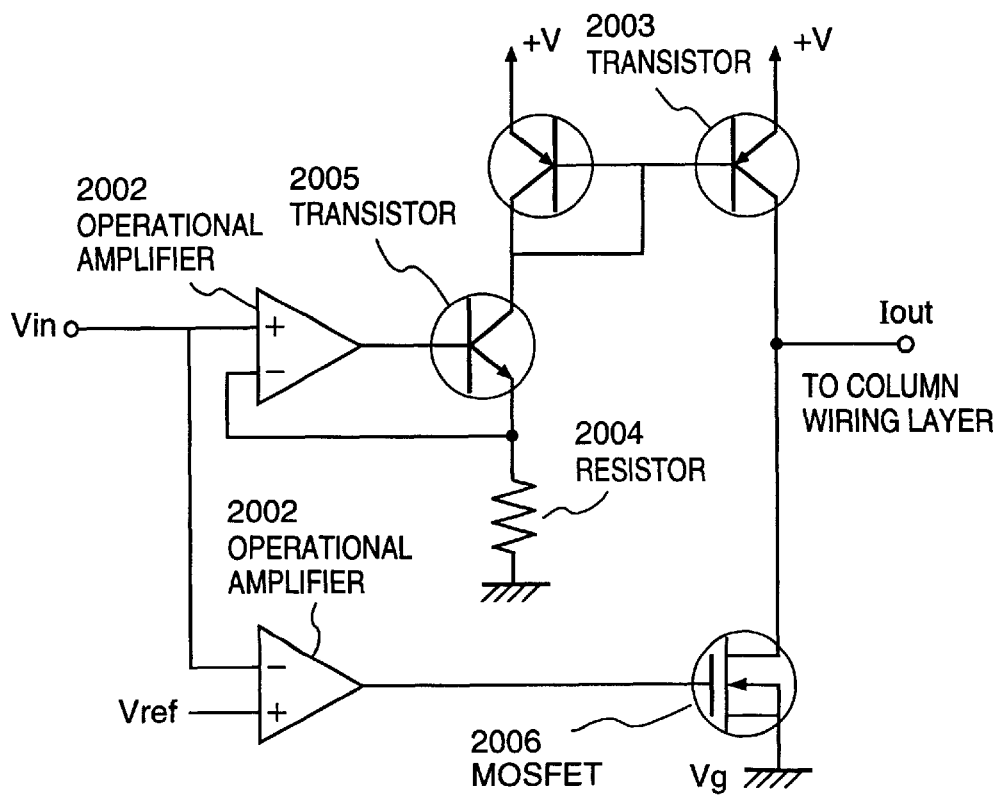
FIG. 26 is a circuit diagram showing a V/I conversion circuit in Example 4.

In Example 4, as a voltage/current conversion circuit, the circuit having the arrangement shown in FIGS. 25 and 26 is used. However, the present invention is not limited to this circuit arrangement, and any circuit may be used as long as it can modulate the current to be supplied to each surface-conduction type electron emitter in accordance with the input signal. If, for example, a large output current is required, the transistor portions may be connected in the form of a Darlignton amplifier.

EXAMPLE 5

In Examples 1 to 4, the multi-electron sources and the display panels which use surface-conduction type electron emitters as electron emitters have been described above. However, when the surface-conduction type electron emitters incorporated in these units were replaced with other types of electron emitters, it was found that the driving methods of the present invention were equally effective.

When the present inventors executed the driving methods of Examples 1 to 4 for multi-electron sources and display panels using field emitters as electron emitters, currents flowing in semi-selected emitters were greatly reduced.

Figure 28A:
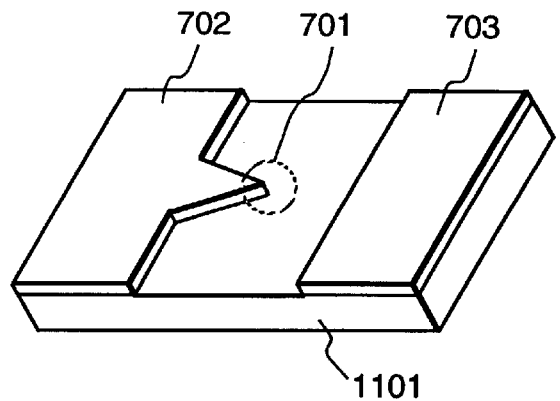
FIGS. 28A to 28C are perspective views showing lateral-type field emitters.
Figure 28B:
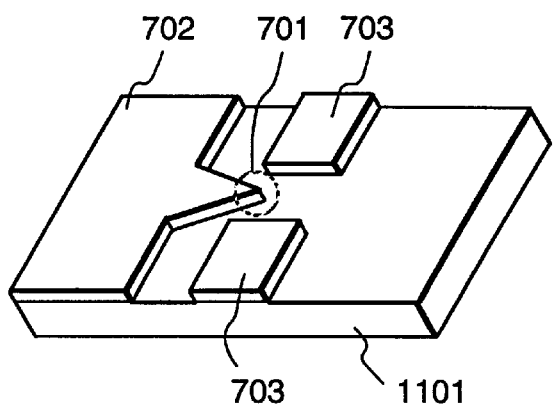
Figure 28C:
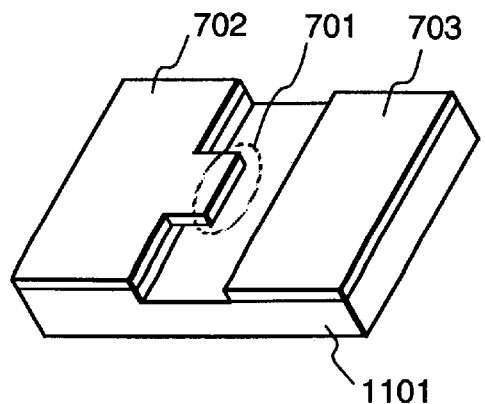

For examples, lateral-type field emitters like those shown in FIGS. 28A, 28B, and 28C were used in place of surface-conduction type electron emitters. Referring to FIGS. 28A to 28C, reference numeral 1101 denotes a glass substrate; 701, an electron-emitting portion; 702, a negative electrode; and 703, a gate (positive electrode). In each of these lateral-type field emitters, when an appropriate voltage is applied between the negative electrode 702 and the gate 703, an electron beam is emitted from the electron-emitting portion 701.

Figure 29:
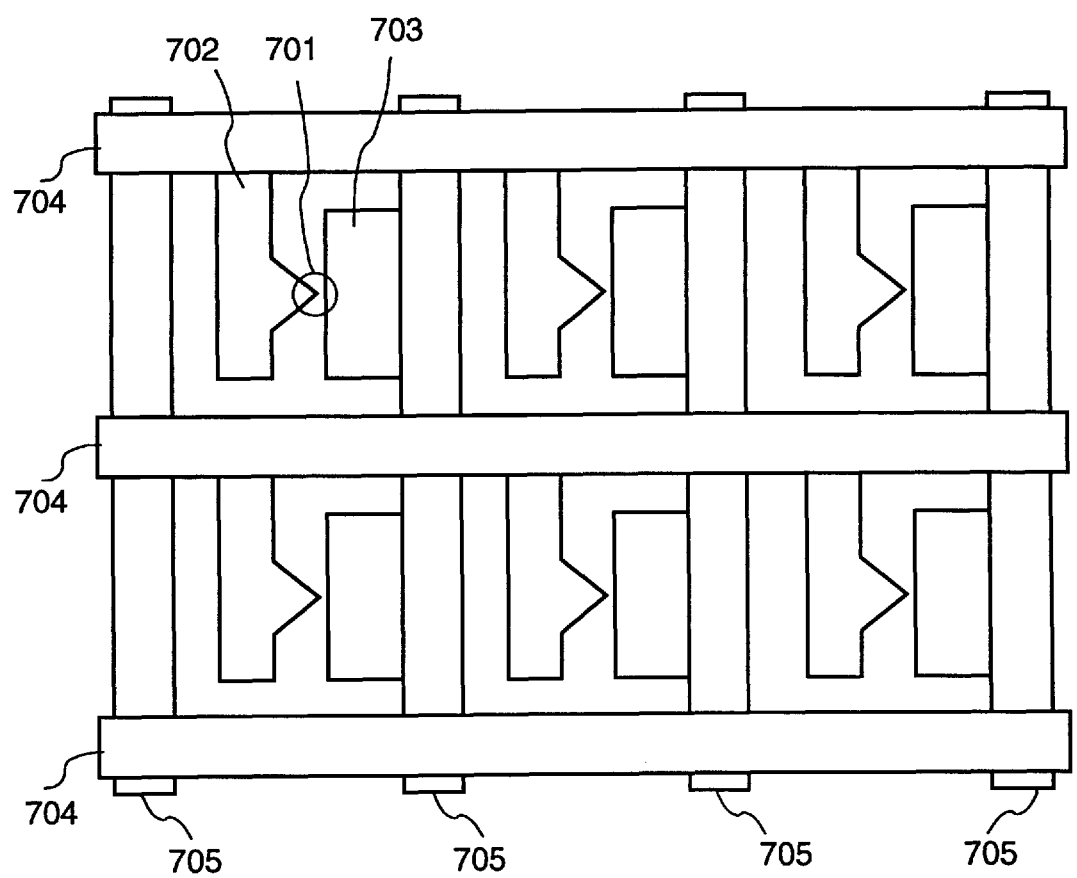
FIG. 29 is a view showing a multi-electron source using lateral-type field emitters.
Figure 30:
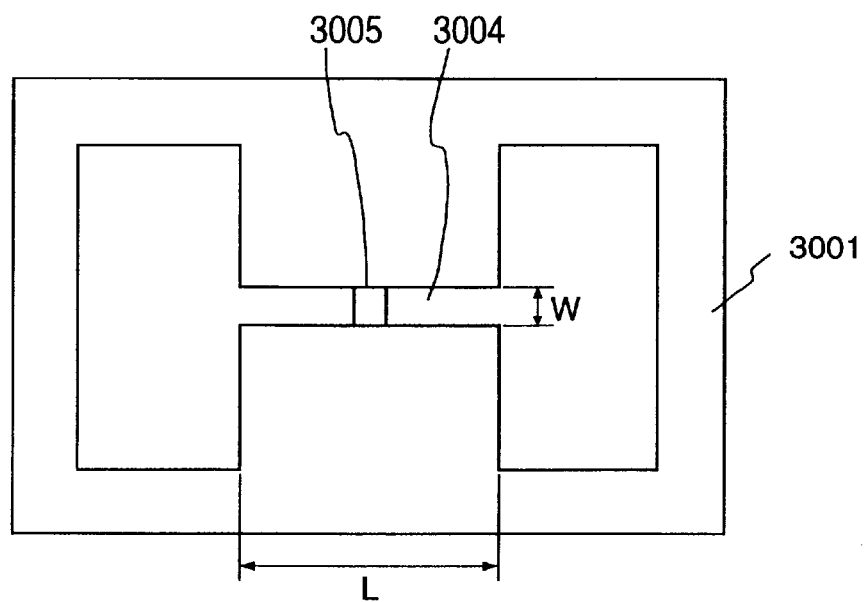
FIG. 30 is a plan view showing the surface-conduction type electron emitter disclosed by M. Hartwell.
Figure 31:
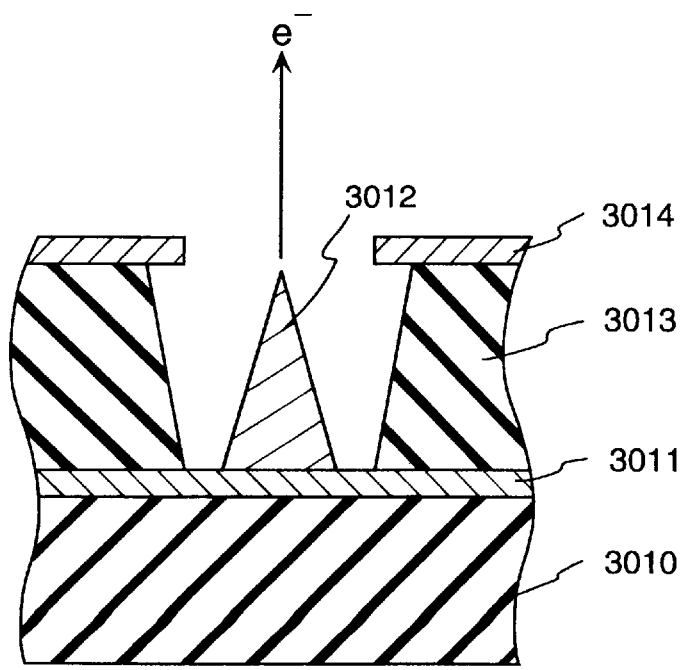
FIG. 31 is a sectional view showing a conventional Spindt-type field emitter.
Figure 32:
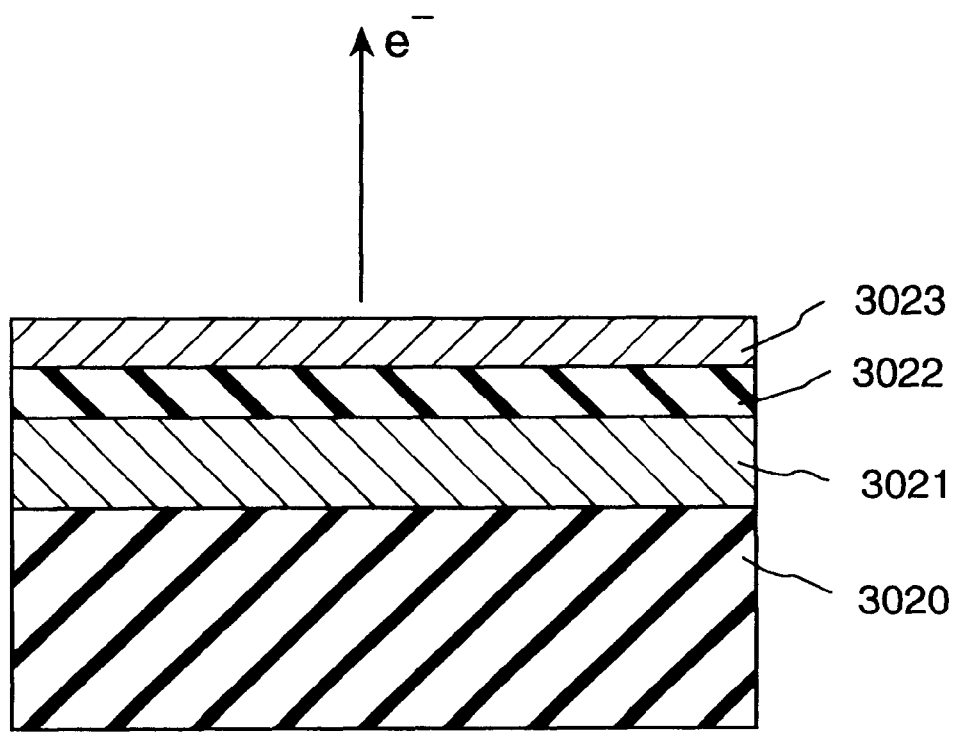
FIG. 32 is a sectional view showing a conventional MIM-type electron emitter.
Figure 33:
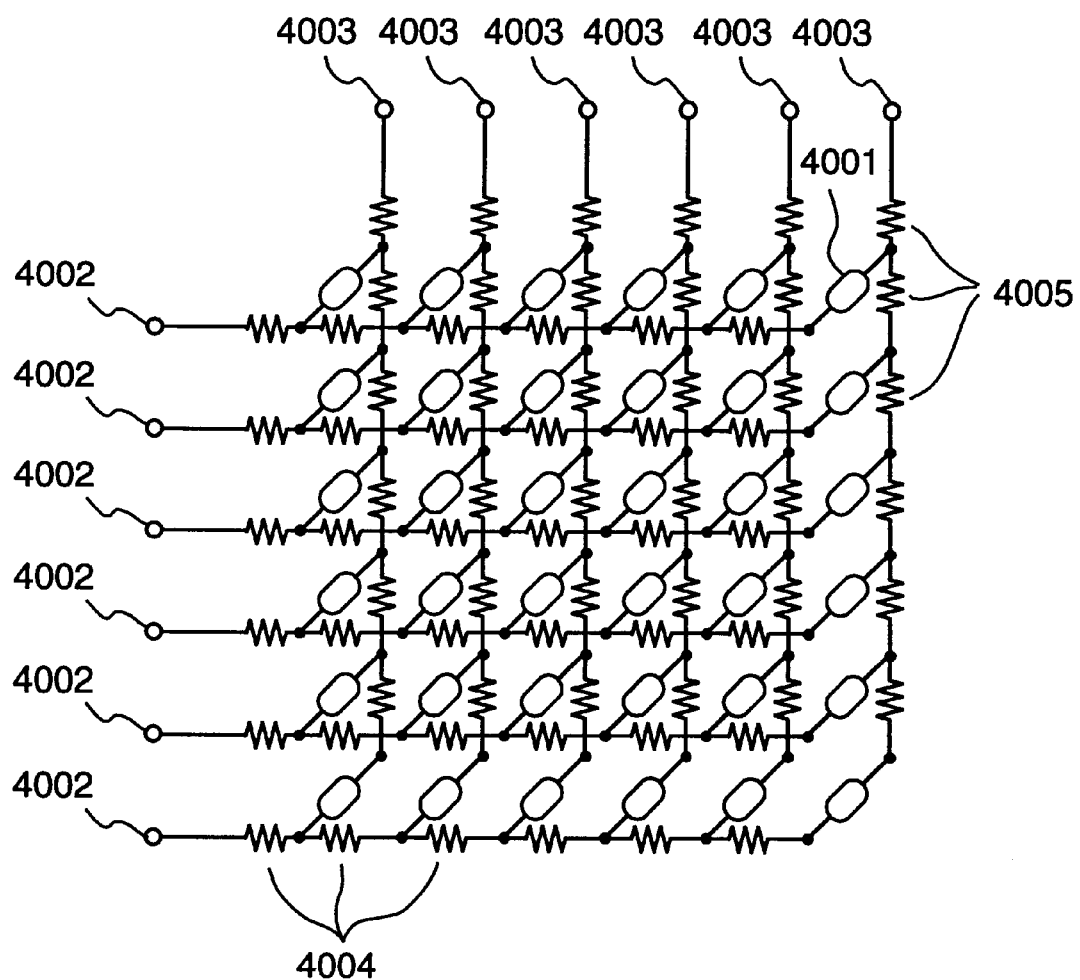
FIG. 33 is a view showing a simple matrix wiring structure.
Figure 34:
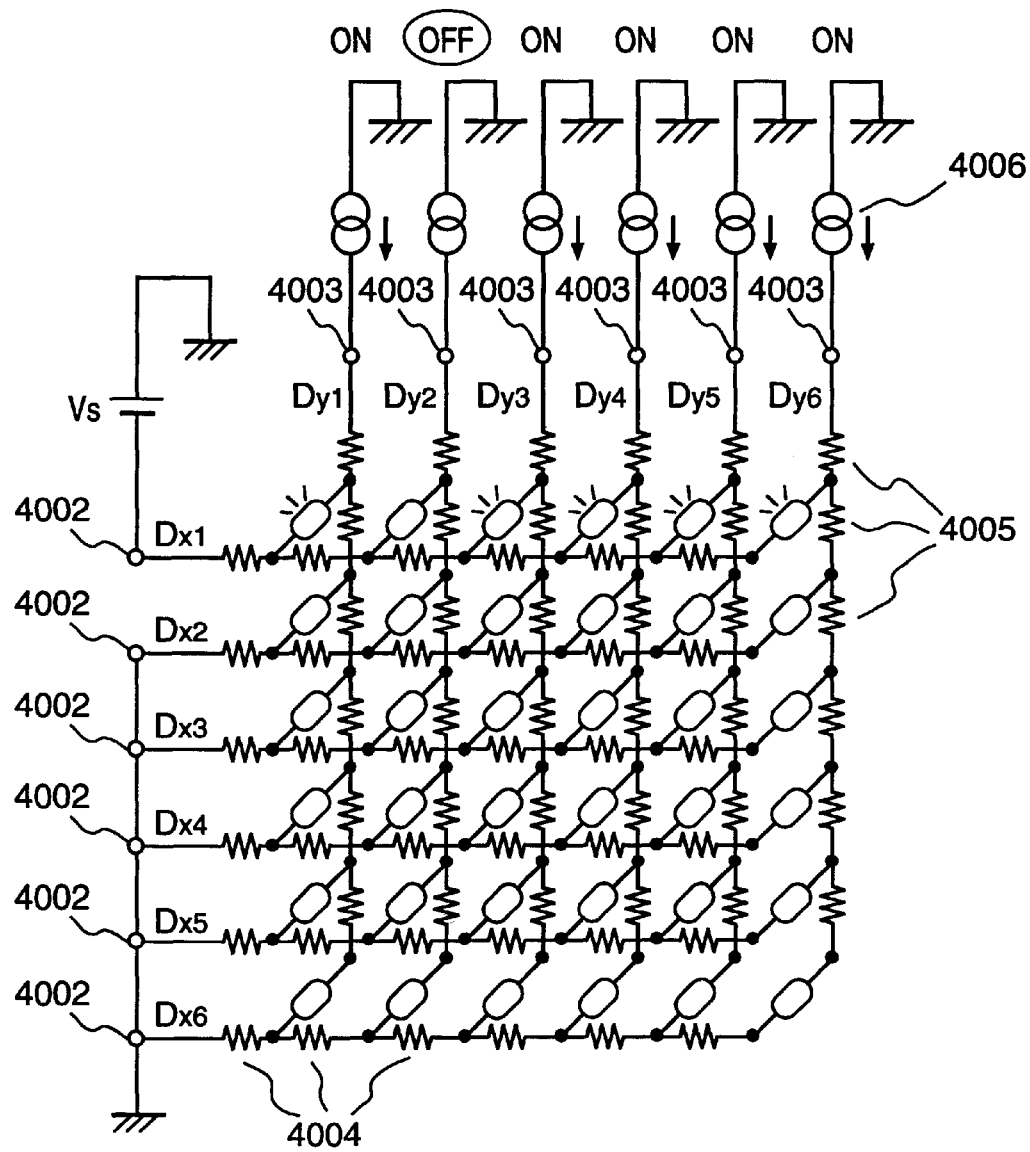
FIG. 34 is a view showing a simple matrix wiring structure to be current-driven.

FIG. 29 is a plan view showing a multi-electron source having lateral-type field emitters, each identical to the one shown in FIG. 28A, wired in the form of a matrix. Referring to FIG. 29, reference numeral 704 denotes a row wiring layer to which the negative electrodes 702 of the lateral-type field emitters are commonly connected; and 705, a column wiring layer to which the gates 703 of the lateral-type field emitters are commonly connected.

When the driving method of the present invention was applied to the above multi-electron source and an image display apparatus having the multi-electron source, an electron beam having a desired intensity could be accurately output without using any complicated compensation circuit. In addition, the power consumed by each semi-selected emitter could be reduced.

Furthermore, the present invention was effective for an electron source using electron emitters different from those described above and an image display apparatus using the electron source. For example, the present invention was also effective for Spindt-type field emitters and MIM-type electron emitters.

As many apparently widely different embodiments of the present invention can be made without departing from the spirit and scope thereof, it is to be understood that the invention is not limited to the specific embodiments thereof except as defined in the appended claims.

What is claimed is:

1. A driving circuit for driving a multi-electron source having a plurality of data wirings, each of which connects to a plurality of electron emitters, and a plurality of scanning wirings, the electron emitters being wired in the form of a matrix through the plurality of data wirings and the plurality of scanning wirings, the driving circuit comprising:
    a constant current unit for causing the flow of a constant current;
    a constant voltage unit for outputting a constant voltage: and
    at least one switch which is operable for coupling either the constant current unit or the constant voltage unit to the data wirings of said multi-electron source.

2. The circuit according to claim 1, wherein the constant current flow caused by said constant current unit is an emitter current to be caused to flow to at least one of the electron emitters to obtain a desired emission current, and
    the constant voltage output from said constant voltage unit is a voltage which is set such that a difference between the constant voltage and a scanning voltage applied to the scanning wirings is smaller than a value of an electron emission threshold voltage of an electron emitter.

3. The circuit according to claim 1, wherein said switch switches connection between said constant voltage unit and the data wirings and connection between said constant voltage unit and the data wirings.

4. The circuit according to claim 1, wherein said switch comprises switches equal in number to the number of data wirings.

5. The circuit according to claim 1, wherein said switch comprises a transistor.

6. The circuit according to claim 5, wherein said transistor is a bipolar transistor.

7. The circuit according to claim 6, wherein said transistor has a collector or emitter grounded.

8. The circuit according to claim 5, wherein said transistor is an enhancement type MOS transistor.

9. The circuit according to claim 8, wherein said transistor has a drain or source grounded.

10. The circuit according to claim 1, further comprising a pulse-width modulation circuit for performing a switching operation of said switch.

11. The circuit according to claim 1, wherein said constant voltage unit comprises a GND wiring.

12. The circuit according to claim 1, wherein said switch comprises a diode.

13. The circuit according to claim 12, further comprising a timing generation circuit for performing a switching operation of said switch.

14. The circuit according to claim 11, wherein said constant current unit comprises a V/I converter.

15. The circuit according to claim 1, wherein said switch connects the data wirings to said constant voltage unit when a value of a luminance signal is smaller than a value of a reference signal, and connects the data wirings to said constant current unit when the value of the luminance signal is not less than the value of the reference signal.

16. The circuit according to claim 1, wherein said switch connects the data wirings connected to the electron emitter whose electron emission amount is to be 0 to said constant voltage unit, and connects the data wirings connected to an electron source whose electron emission amount is to be a value other than 0 to said constant current unit.

17. An electron generating device comprising a multi-electron source having a plurality of data wirings, each of which connects to a plurality of electron emitters, and a plurality of scanning wirings, the electron emitters being wired in the form of a matrix through the plurality of data wirings and the plurality of scanning wirings, and a driving circuit for driving said multi-electron source, said driving circuit comprising:
    a constant current unit for causing the flow of a constant current;
    a constant voltage unit for outputting a constant voltage; and
    at least one switch which is operable for coupling either the constant current unit or the constant voltage unit to the data wirings of said multi-electron source.

18. The device according to claim 17, wherein the electron emitter is a surface-conduction type electron emitter.

19. An image display apparatus comprising a multi-electron source having a plurality of data wirings, each of which connects to a plurality of electron emitters, and a plurality of scanning wirings, the electron emitters being wired in the form of a matrix through the plurality of data wirings and the plurality of scanning wirings,
    a driving circuit for driving said multi-electron source, and
    a phosphor which is excited to emit light upon irradiation of electrons,
    wherein said driving circuit comprises:
        a constant current unit for outputting a constant current;
        a constant voltage unit for outputting a constant voltage; and
        at least one switch which is operable for coupling either the constant current unit or the constant voltage unit to the data wirings of said multi-electron source.

20. A driving method for an electron generating device including a multi-electron source having a plurality of electron data writings, each of which connects to a plurality of electron emitters, and a plurality of scanning wirings, the electron emitters being wired in the form of a matrix through the plurality of data wirings and the plurality of scanning wirings, and a driving circuit, the method comprising steps of:
    generating a constant current signal and a constant voltage in the driving circuit; and
    operating a switch for coupling either the constant current signal or the constant voltage to the data wirings of the multi-electron source,
    wherein a luminance signal is outputted to the data wirings as the constant current signal.

21. The method according to claim 20, wherein the constant current signal is output from a V/I converter.

22. The method according to any one of claims 20 and 21, wherein the constant voltage is GND.

23. The method according to claim 20, wherein the constant current signal and the constant voltage are switched in accordance with an output signal from a pulse-width modulation circuit.

24. The method according to claim 20, wherein the constant current signal and the constant voltage are switched in accordance with an output signal from a timing generation circuit.

25. The method according to claim 24, wherein said timing generation circuit flows the constant current signal to the data wirings during a video display period, and outputs a pulse for setting the data wirings to the constant voltage during a blanking period.

26. A driving method for an image display apparatus including a multi-electron source having a plurality of data wirings, each of which connects to a plurality of electron emitters, and a plurality of scanning wirings, the electron emitters being wired in the form of a matrix through the plurality of data wirings and the plurality of scanning wirings, a driving circuit, and a phosphor plate, the method comprising steps of:

generating a constant current signal and a constant voltage in the driving circuit; and operating a switch for coupling either the constant current signal or the constant voltage to the data wirings of said multi-electron source, wherein a luminance signal is outputted as the constant current signal to the plurality of data wirings of said multi-electron source for exciting the phosphor plate to emit light upon irradiation of electrons.

27. The method according to claim 20, wherein the constant voltage is applied to the data wirings while the luminance signal is not outputted.

28. The method according to claim 26, wherein the constant voltage is applied to the data wirings while the luminance signal is not outputted.

29. A driving circuit for driving a multi-electron source having a plurality of electron emitters wired in the form of a matrix through a plurality of data wirings and a plurality of scanning wirings, the driving circuit comprising:

a constant current unit for causing the flow of a constant current;

a constant voltage unit for outputting a constant voltage; and at least one switch operable for coupling either the constant current unit or the constant voltage unit to the data wirings of said multi-electron source, wherein the constant current flow caused by said constant current unit is an emitter current flowing to at least one of the electron emitters to obtain a desired emission current, and the constant voltage output from said constant voltage unit is a voltage which is set such that a difference between the constant voltage and a scanning voltage applied to the scanning wirings is smaller than a value of an electron emission threshold voltage of an electron emitter.

30. A driving circuit for driving a multi-electron source having a plurality of electron emitters wired in the form of a matrix through a plurality of data wirings and a plurality of scanning wirings, the driving circuit comprising:

a constant current unit for causing the flow of a constant current;

a constant voltage unit for outputting a constant voltage; and at least one switch operable for coupling either the constant current unit or the constant voltage unit to the data wirings of said multi-electron source, wherein said switch connects the data wirings to said constant voltage unit when a value of a luminance signal is smaller than a value of a reference signal, and connects the data wirings to said constant current unit when the value of the luminance signal is not less than the value of the reference signal.

31. A driving method for an electron generating device including a multi-electron source having a plurality of electron emitters wired in the form of a matrix through a plurality of data wirings and a plurality of scanning wirings, and a driving circuit, the method comprising the steps of:

generating a constant current signal and a constant voltage in the driving circuit; and operating a switch for coupling either the constant current signal or the constant voltage to the data wirings of said multi-electron source, wherein a luminance signal is outputted to the data wirings as the constant current signal and the constant current signal, and the constant voltage are switched in accordance with an output signal from a timing generation circuit which flows the constant current signal to the data wirings during a video display period and outputs a pulse for setting the data wirings to the constant voltage during a blanking period.

* * * * *

UNITED STATES PATENT AND TRADEMARK OFFICE
CERTIFICATE OF CORRECTION

PATENT NO. : 6,169,528 B1
DATED : January 2, 2001
INVENTOR(S) : Takahiro Oguchi et al.

It is certified that error appears in the above-identified patent and that said Letters Patent is hereby corrected as shown below:

Column 7,
Line 66, "ugh" should read -- view --.

Column 11,
Line 32, "In summary," should read -- ¶ Voltage Drive Pulse SW Transistor Mode Panel --.

Column 18,
Line 4, "1x10⁻⁶," should read -- $1 \times 10^6 \Omega$, --; and
Line 59, "While" should read -- ¶ While --.

Column 19,
Line 57, "form" should read -- form- --.

Column 21,
Line 24, "NMOS" should read -- nMOS --.

Column 22,
Line 8, "sinal" should read -- signal --.

Signed and Sealed this

Twenty-ninth Day of January, 2002

Attest:

JAMES E. ROGAN
Attesting Officer      Director of the United States Patent and Trademark Office